United States Patent
Totani et al.

(10) Patent No.: US 7,325,824 B2
(45) Date of Patent: Feb. 5, 2008

(54) HEAD-PROTECTING AIRBAG DEVICE

(75) Inventors: Chiharu Totani, Aichi-ken (JP); Masayasu Okada, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 459 days.

(21) Appl. No.: 10/929,516

(22) Filed: Aug. 31, 2004

(65) Prior Publication Data
US 2005/0052001 A1 Mar. 10, 2005

(30) Foreign Application Priority Data
Sep. 4, 2003 (JP) ............................. 2003-312228

(51) Int. Cl.
*B60R 21/16* (2006.01)
*B60R 21/20* (2006.01)
(52) U.S. Cl. .................. 280/728.2; 280/730.2
(58) Field of Classification Search ............. 280/730.2, 280/728.2
See application file for complete search history.

(56) References Cited

U.S. PATENT DOCUMENTS 6,129,377 A * 10/2000 Okumura et al. ........ 280/730.2
6,145,870 A * 11/2000 Devane et al. ........... 280/728.2
6,402,188 B1 * 6/2002 Pasch ....................... 280/728.2
2001/0022441 A1 * 9/2001 Nakajima et al. ........ 280/730.2

FOREIGN PATENT DOCUMENTS

| JP | 2001-334902 | | 12/2001 |
| JP | 2002-211345 A | * | 7/2002 |
| JP | 2002-249011 A | * | 9/2002 |
| JP | 2003-104156 A | * | 4/2003 |

* cited by examiner

*Primary Examiner*—Ruth Ilan
(74) *Attorney, Agent, or Firm*—Posz Law Group, PLC

(57) ABSTRACT

A head-protecting airbag device according to the present invention is mounted on vehicle by attaching an airbag module including an airbag and a roof rail garnish to vehicle. The garnish covers an interior side of the folded airbag. The airbag module includes a clip having a garnish side joint portion to be detachably engaged with the garnish, and a vehicle body side joint portion to be engaged with vehicle body in a state of holding a mounting portion of the airbag. In the clip, an engaging force of the garnish side joint portion with the garnish is predetermined weaker than an engaging force of the body side joint portion with the vehicle body, such that the garnish is detachable from the vehicle body while leaving the mounting portion of the airbag attached to the vehicle body. In the head-protecting airbag device of the present invention, maintenance of the roof rail garnish is facilitated.

5 Claims, 20 Drawing Sheets

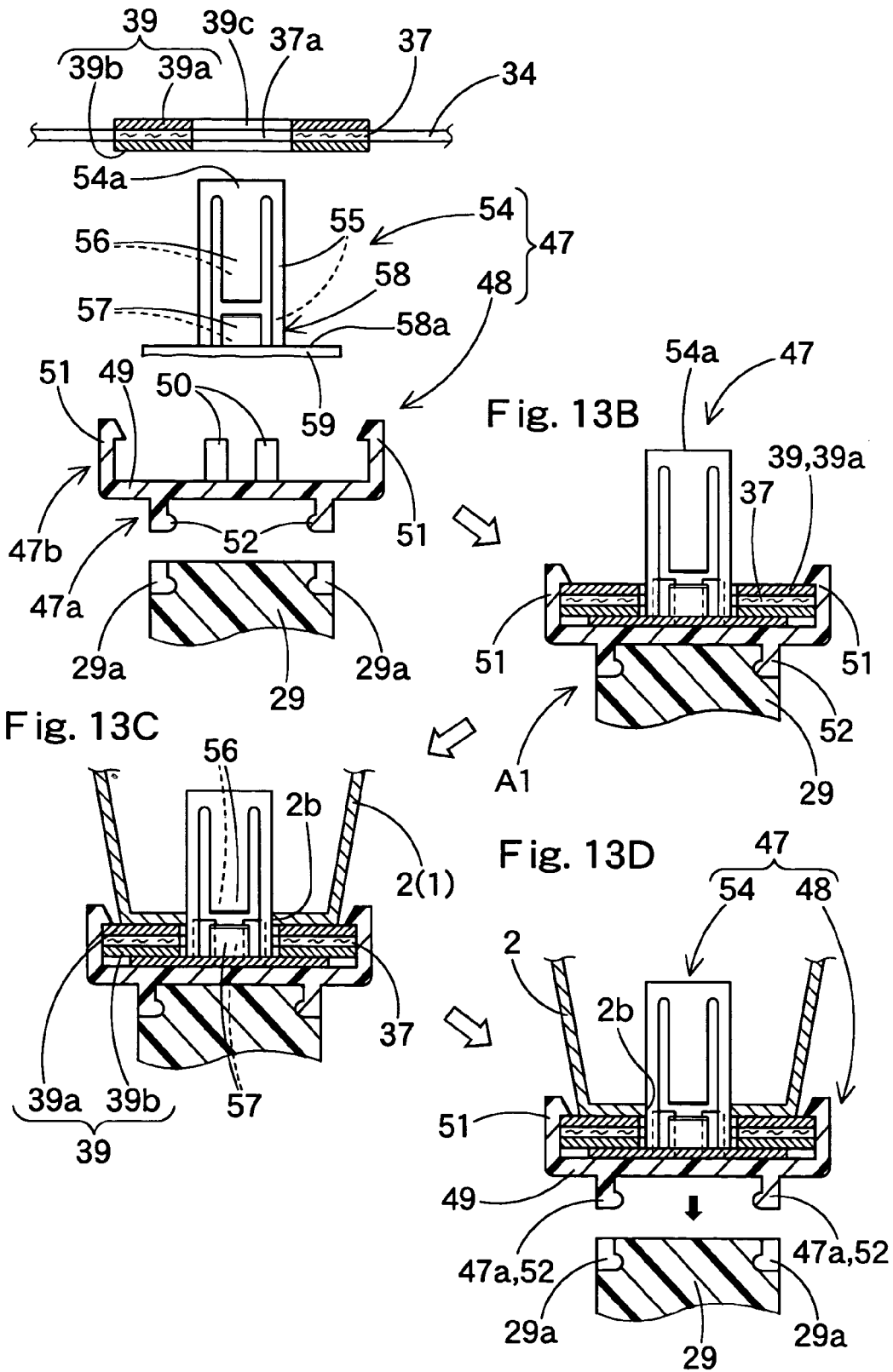

Fig. 16A
Fig. 16B
Fig. 16C
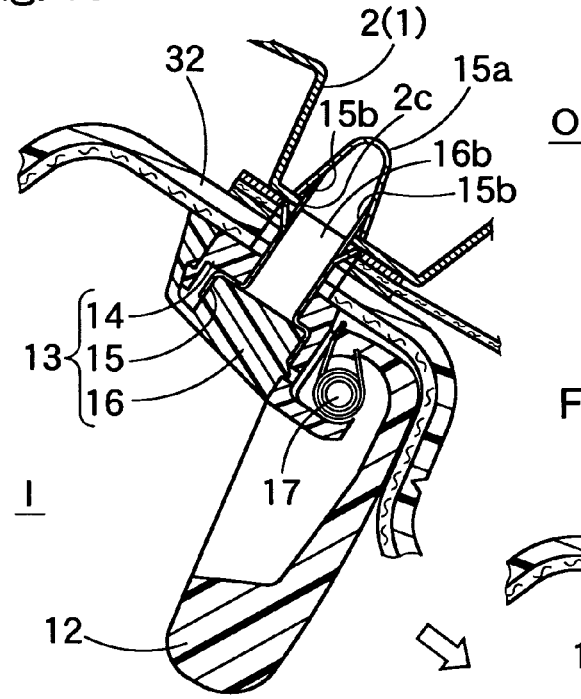
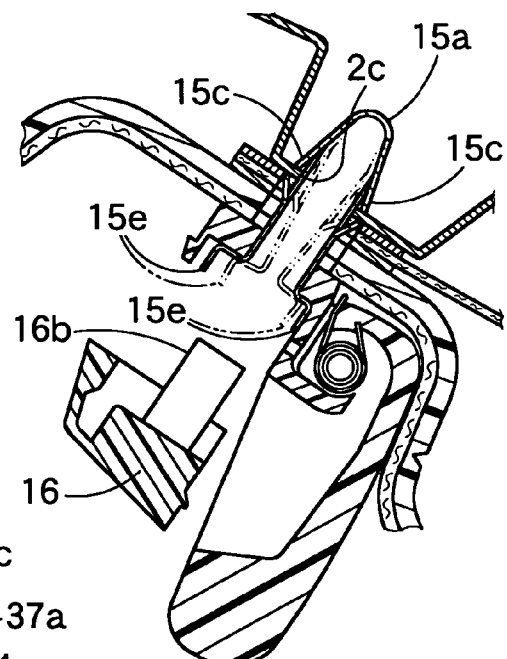
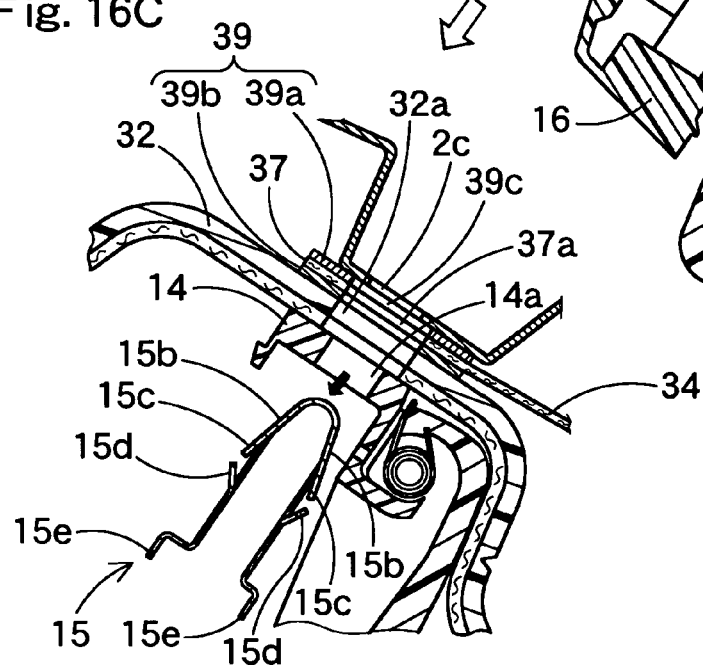

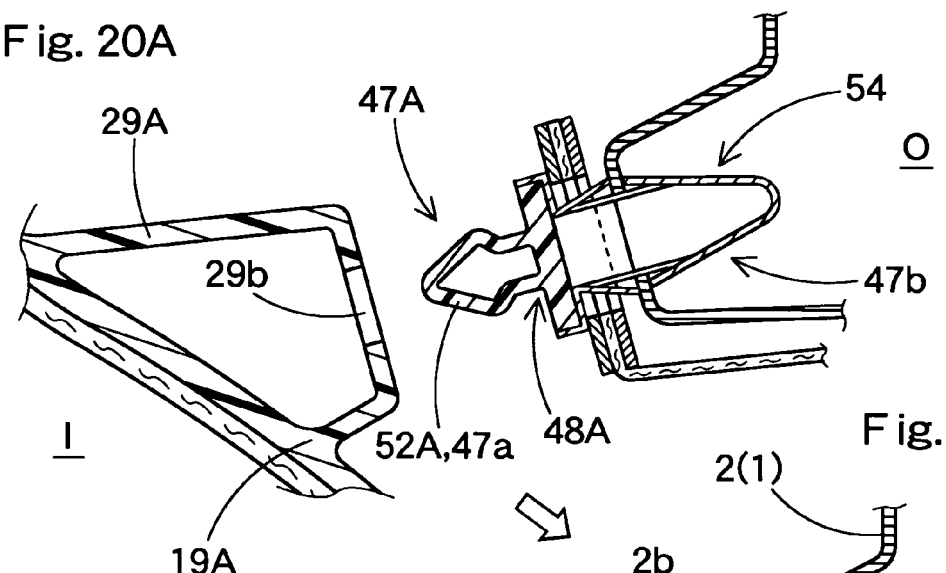
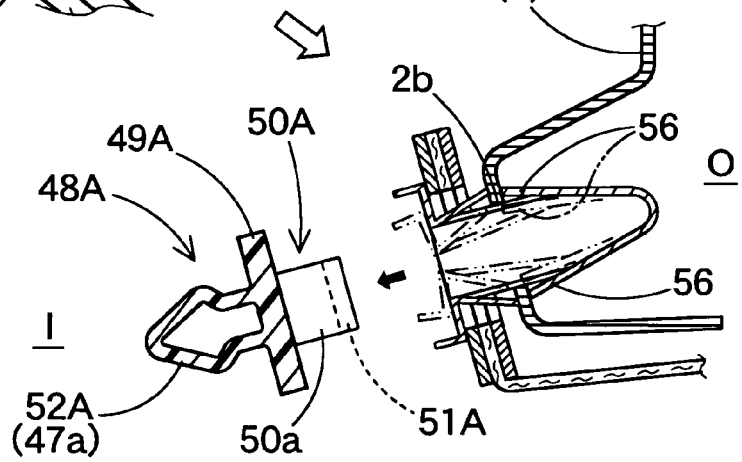
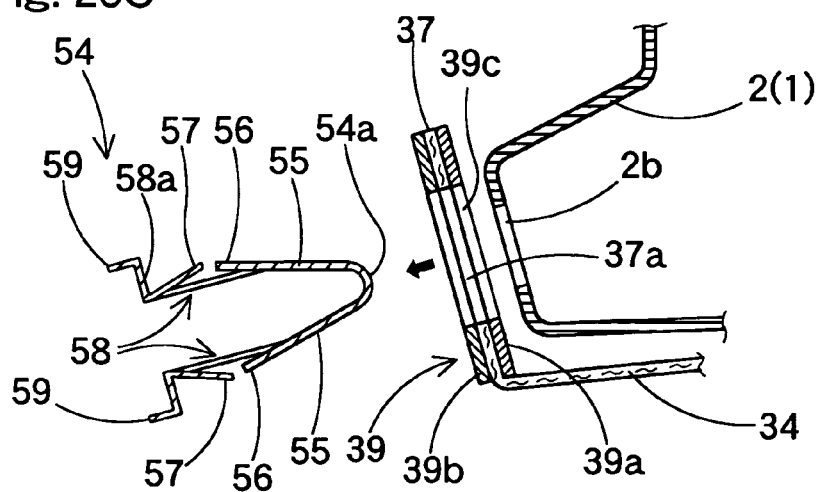

HEAD-PROTECTING AIRBAG DEVICE

The present application claims priority from Japanese Patent Application No. 2003-312228 of Totani et al, filed on Sep. 4, 2003, the entirety of which is hereby incorporated into the present application by reference.

BACKGROUND OF THE INVENTION

1. Field of the Invention

The present invention relates to a head-protecting airbag device mountable on an automobile, and more particularly, relates to a head-protecting airbag device whose airbag and roof rail garnish for covering the folded airbag are mounted on vehicle in an integrally assembled state as an airbag module.

2. Description of Related Art

A conventional head-protecting airbag device of this kind includes an airbag, a roof rail garnish, and an inflator for supplying inflation gas to the airbag, as disclosed in Japanese Laid-Open Patent Application No. 2001-334902.

In this airbag device, the airbag is folded and arranged in an upper edge of side windows inside the vehicle, along the front-rear direction. The roof rail garnish has a unitary plate-shape and is located in an area extending in the front-rear direction between a roof head lining and side windows for covering an interior side of the folded airbag. The garnish includes a door portion in its lower part which is pushed by the inflating airbag and open when the airbag deploys to cover interior sides of side windows.

In this airbag, the airbag, the roof rail garnish, and the inflator are mounted on the vehicle in an integrally assembled state as an airbag module.

However, this airbag module is attached to the vehicle by fastening bolts with nuts formed in an inner panel of the vehicle body, from vehicle's interior side of the roof rail garnish. Moreover, the bolts also fasten mounting portions of the airbag together. Accordingly, in such occasions as maintenance or changing the roof rail garnish, it is necessary to detach the whole airbag module from vehicle body, remove the roof rail garnish from the airbag module, and then forming a new airbag module with a new garnish, and then attach it to the vehicle, which complicates maintenance of the roof rail garnish.

SUMMARY OF THE INVENTION

The present invention contemplates to solve the above-mentioned problem, and therefore, has an object to provide a head-protecting airbag device which facilitates maintenance of a roof rail garnish.

The head-protecting airbag device according to the present invention includes an airbag module constructed of an airbag and a roof rail garnish. The airbag is folded and housed in the upper periphery of side windows inside a vehicle, and deploys to cover the side windows when fed with inflation gas. The roof rail garnish is adapted to cover a vehicle's interior side of the folded airbag, and includes a door portion openable upon airbag deployment. By attaching the airbag module to a vehicle, the airbag and the roof rail garnish are mounted on the vehicle at one time. The airbag module includes a clip which has a garnish side joint portion to be detachably engaged with the roof rail garnish, and a vehicle body side joint portion to be engaged with vehicle body in a state of holding a mounting portion of the airbag. In the clip, an engaging force of the garnish side joint portion with the roof rail garnish is predetermined weaker than an engaging force of the body side joint portion with the vehicle body, such that the roof rail garnish can be detached from the vehicle body while leaving the mounting portion of the airbag attached to the vehicle body.

In the head-protecting airbag device of the present invention, the airbag module is mounted on a vehicle by engaging the body side joint portion of the clip which has been already joined with the roof rail garnish and holds the mounting portion of the airbag with the vehicle body. Since the engaging force of the garnish side joint portion of the clip with the roof rail garnish is weaker than the engaging force of the body side joint portion with the vehicle body, in such an occasion as maintenance, if the roof rail garnish is pulled inward forcefully, only the roof rail garnish is detached from the vehicle body while leaving the clip and the mounting portion of the airbag retained by the vehicle body, so that the roof rail garnish is replaceable.

In the head-protecting airbag device of the present invention, therefore, maintenance of the roof rail garnish is facilitated since only the garnish can be detached after the airbag module is mounted on the vehicle.

It is desired that the body side joint portion of the clip is able to allow the mounting portion of the airbag to be detachable from the vehicle body after removing the roof rail garnish.

With this construction, the mounting portion of the airbag is detachable from the vehicle body after removing the garnish, so that the airbag is also replaceable, and maintenance of the whole head-protecting airbag device is facilitated.

The clip thus described desirably includes:

a retaining piece including: two side walls confronting each other formed by bending a band-shaped spring sheetmetal to have a substantially U-shaped section; retaining projections projecting outwardly from each of the side walls for preventing the clip from falling off vehicle's inward when inserted into a mounting hole of the vehicle body and retained in exterior periphery of the mounting hole; and a bag holding portion located vehicle's inward than the retaining projections, the bag holding portion being inserted into the mounting portions of the airbag for holding the mounting portion and keeping the mounting portion from shifting vehicle's inward; and a base including: a spacer to be inserted in between the side walls of the retaining piece for preventing the side walls from approaching each other, such that the retaining projections are prevented from shifting into the mounting hole in the vehicle body; a bag regulating portion for keeping the mounting portion of the airbag held by the bag holding portion from shifting vehicle's outward when the spacer is inserted in between the side walls; and a garnish side engaging portion to be detachably engaged with the roof rail garnish; and it is desired that:

the garnish side engaging portion of the base constitutes the garnish side joint portion;

the retaining piece, the spacer of the base, and the bag regulating portion of the base cooperatively constitute the body side joint portion; and an engaging force of the bag regulating portion with the mounting portion of the airbag as the bag holding portion holds the mounting portion is predetermined greater than an engaging force of the garnish side joint portion with the roof rail garnish.

To handle such a clip, a spacer of the base is firstly located between the side walls of the retaining piece, and the retaining piece is inserted into the mounting portion of the folded airbag. Thus the mounting portion of the airbag is held from moving outward by the bag regulating portion of the base, and held from moving inward by the bag holding portion of the retaining piece, and is retained by the bag holding portion of the retaining piece. In this state, subsequently, if the clip is joined with the roof rail garnish by having the garnish side engaging portion (or the garnish side joint portion) engaged with the roof rail garnish, the airbag module is formed. Thereafter, if the retaining piece of the clip is inserted into a mounting hole in the vehicle body, the retaining projections are once deformed to pass through the mounting hole, and then spring back so as to be retained in the exterior periphery of the mounting hole, and prevented from being pulled out inward. Consequently, the roof rail garnish and the mounting portion of the airbag are secured to the vehicle body utilizing the clip.

Thereafter, in such an occasion as maintenance, if the roof rail garnish is pulled inward forcefully, in the clip, the garnish side engaging portion as the garnish side joint portion stops the joinder with the roof rail garnish, so that the roof rail garnish is detached from the vehicle body. At this time, the spacer remains between the side walls of the retaining piece, so that the side walls do not approach each other to shift the retaining projections into the mounting hole. Accordingly, the retaining piece is not pulled out of the mounting hole of the body, and the bag holding portion of the retaining piece keeps holding the mounting portion of the airbag.

This means that the clip is able to retain the mounting portion of the airbag to the vehicle body stably even if the garnish side engaging portion as the garnish side joint portion stops the joinder with the roof rail garnish upon airbag deployment. Therefore, even if the roof rail garnish falls off from the body in a position of the clip upon airbag deployment, the airbag remains attached to the vehicle body by the clip, and is able to deploy stably. If the roof rail garnish is detached from the vehicle body in the clip, an opening of the door portion of the garnish is broadened, so that the airbag is able to deploy smoothly from the broadened opening.

Upon maintenance, in the body side joint portion of the clip as the garnish side engaging portion, the mounting portion of the airbag is detachable from the vehicle body if, after detaching the roof rail garnish from the vehicle body, the spacer of the base is removed from a space between the side walls of the retaining piece while the bag regulating portions are taken off from the mounting portion of the airbag, the side walls of the retaining piece are brought closer to each other to shift the retaining projections into the mounting hole, and the retaining piece is pulled out of the mounting hole toward interior. Accordingly, the mounting portion of the airbag is detachable from the vehicle body, so that the airbag is in condition for being taken care of.

Therefore, the clip as thus described is able to hold the airbag stably while securing easy maintenance of the roof rail garnish and the airbag.

The roof rail garnish desirably includes a mounting member to be detachably attached to the vehicle body having mounting holes. This mounting member includes a metal axis arranged in the exterior side of the roof rail garnish, and a cap made from rubber or soft synthetic resin and covered over the axis. The axis includes a neck portion and a head bulged in radius direction at the leading end of the neck portion. The cap has a substantially cylindrical shape capable of covering over the axis and being retained by the head of the axis, and is provided with: a thick retaining portion located at the leading end; a retaining recess located in the outer circumference near a root part of the retaining portion; and a U-groove located in the outer circumference near a root part of the cap. An inner diameter of the cap is predetermined such that the head of the axis may be pulled out of the cap when the U-groove is located in an inner circumference of the mounting hole in the vehicle body as the cap is retained by the head of the axis. When the mounting member of the garnish is attached to the vehicle body, the mounting member is inserted into a mounting hole of the vehicle body from vehicle's interior as the cap is retained by the head of the axis, and has the retaining portion of the cap retained in exterior periphery of the mounting hole, such that the roof rail garnish is attached to the vehicle body in a condition that the garnish is capable of shifting vehicle's inward according to plastic deformation of the cap retaining portion when the garnish is pulled vehicle's inward, and when the mounting member of the garnish is detached from the vehicle body, the mounting member is pushed in vehicle's outward together with the roof rail garnish until the U-groove of the cap is positioned in the inner circumference of the mounting hole, and then the axis is pulled out of the cap and the mounting hole toward vehicle's interior while leaving the cap retained in the periphery of the mounting hole, such that the mounting member of the garnish is detached from the vehicle body.

With this construction, even if the garnish side joint portion of the clip stops the joinder with the roof rail garnish upon airbag deployment, the clip is able to retain the mounting portion of the airbag to the vehicle body stably. Moreover, even if the roof rail garnish falls off from the vehicle body in a position of the clip, the roof rail garnish remains attached to the vehicle body by the mounting member while allowing the roof rail garnish to move inward according to plastic deformation of the cap retaining portion, which broadens an opening of the door portion of the roof rail garnish. Therefore, the airbag is able to deploy smoothly from the broadened opening.

BRIEF DESCRIPTION OF DRAWINGS

FIGS. 13A, 13B, 13C and 13D are sectional views illustrating the attachment process and removal process of the airbag module in FIG. 11 to/from the vehicle, which correspond to line XIII-XIII in FIG. 11;

FIGS. 16A, 16B and 16C illustrate the removal process of the assist grip in the airbag module in FIG. 11 from the vehicle body;

FIGS. 20A, 20B and 20C illustrate a removal process of the airbag module in the second embodiment from the vehicle body.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
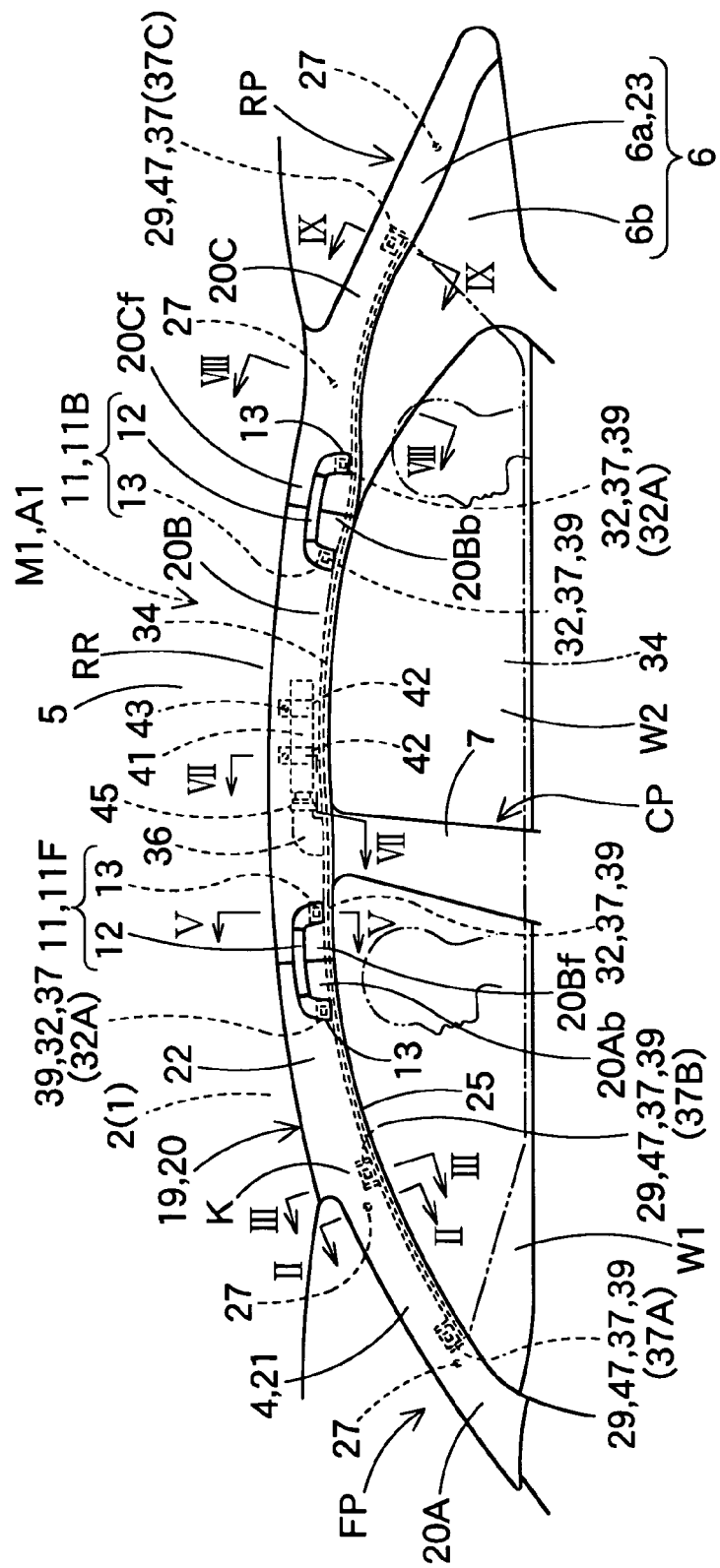
FIG. 1 is a front view of a first embodiment of the head-protecting airbag device according to the present invention, as viewed from the vehicle's interior.

Referring to FIG. 1, a first embodiment of the head-protecting airbag device M1 according to the present invention locates a folded airbag 34 elongatively along upper edges of side windows W1 and W2 inside the vehicle, from a front pillar FP to an upper part of a rear pillar RP, via a roof side rail RR above a center pillar CP or a middle pillar.

Relationships of up-down, front-rear, and left-right in this specification are based on a state of the head-protecting airbag device mounted on a vehicle, and therefore, correspond to up-down, front-rear, and left-right of the airbag device mounted on a vehicle.

The head-protecting airbag device M1 includes an airbag 34, an inflator 41, mounting brackets 39 and 42, a roof rail garnish 19, clips 47, and assist grips 11. In this airbag device M1, the airbag 34, the mounting brackets 39 and 42, the inflator 41, split parts 20A and 20C of the roof rail garnish 19, and the clips 47 are preliminarily assembled into an airbag module A1, and the airbag device M1 is mounted on the vehicle by attaching the airbag module A1 on the vehicle.

Figure 10:
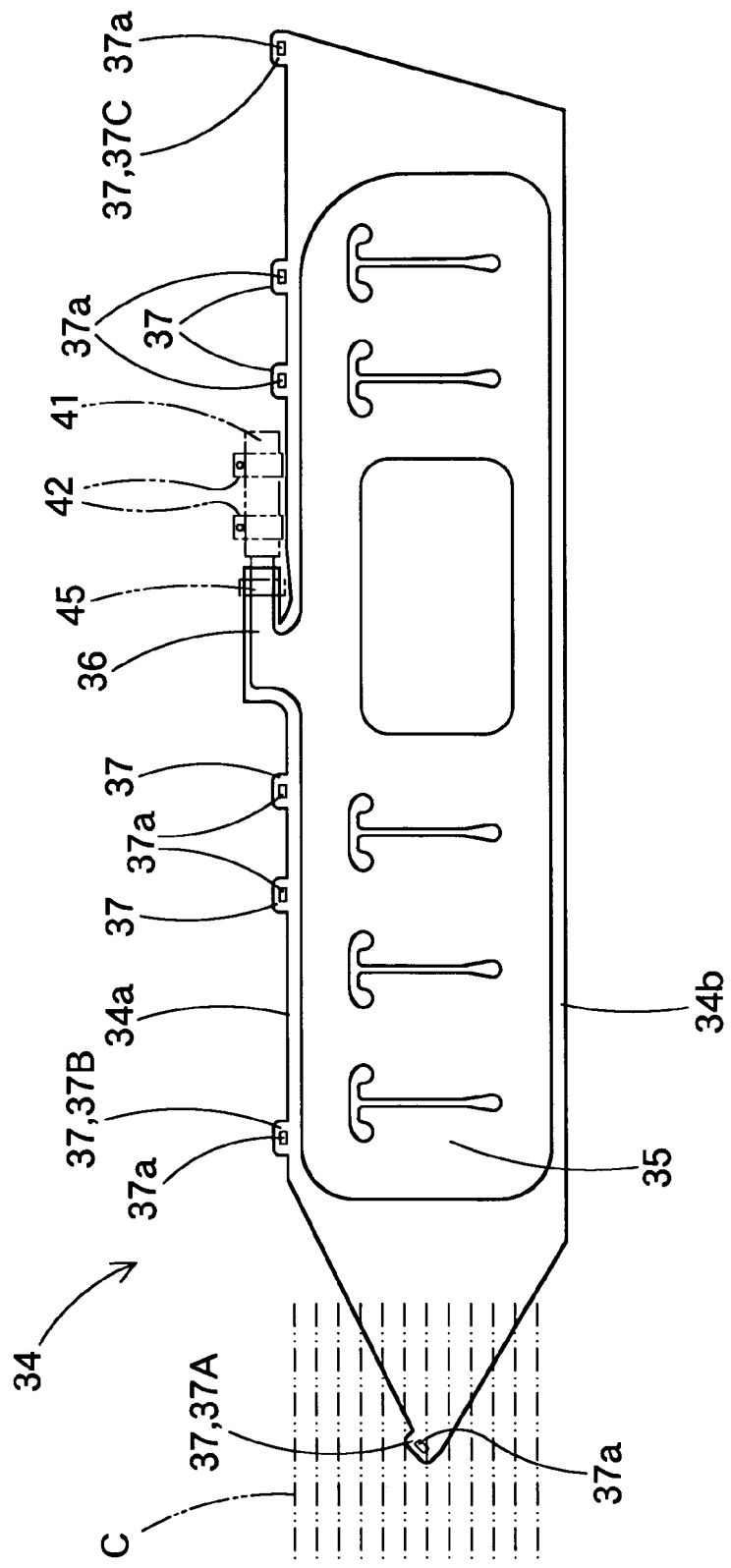
FIG. 10 is a front view of an airbag used in the airbag device in FIG. 1, as flatly expanded.

The airbag 34 is formed by hollow-weaving method of polyamide, polyester yarns or the like, and includes a gas admissive portion 35 which has a substantially rectangular sheet shape and inflates with inflation gas from the inflator 41, as shown in FIGS. 1 and 10. The airbag 34 is provided along its upper edge 34a with a plurality of mounting portions 37 for attachment of the airbag 34 to the vehicle body 1. The airbag 34 is further provided in the middle of the front-rear direction of the gas admissive portion 35 with a tubular joint port 36 extending upward and bent to be joined with the inflator 41.

Each of the mounting portions 37 is provided with a rectangular mounting hole 37a, and a mounting bracket 39, as shown in FIGS. 4, 6, 11, 13 and 14, is attached thereto. Each of the mounting brackets 39 consists of two substantially rectangular plates of sheet metal, i.e., an outer and inner plates 39a and 39b which are located at the inner side I and the outer side O of the mounting portion 37, respectively. Each of the plates 39a and 39b has a through hole 39c shaped correspondingly to the mounting hole 37a. The plates 39a and 39b are fixed to each of the mounting portions 37 by being plastically deformed to protrude partially either toward interior or exterior with the mounting portion 37 put therebetween. Each of the mounting portions 37 is then secured to the inner panel 2 utilizing a later-described retaining piece 15 of the assist grip 11 or a later-described retaining piece 54 of the clip 47 which is respectively put through the mounting hole 37a and the through hole 39c to be held by a mounting hole 2b or 2c formed in the inner panel 2 of the vehicle body 1.

The retaining pieces 15 and 54 also serve to attach the roof rail garnish 19 to the inner panel 2, and the retaining piece 15 further serves to secure the assist grip 11 to the inner panel 2.

As shown in FIGS. 1, 7, 10 and 11, the inflator 41 is joined with the joint port 36 of the airbag 34 by a cramp 45, and is secured to the inner panel 2 as a member of the vehicle body 1 by mounting brackets 42 of sheet metal. Each of the mounting brackets 42 is adapted to cramp the inflator 41, and is secured to the inner panel 2 by screwing a bolt 43 into a nut 2e formed in the mounting hole 2d of the inner panel 2.

Figure 5:
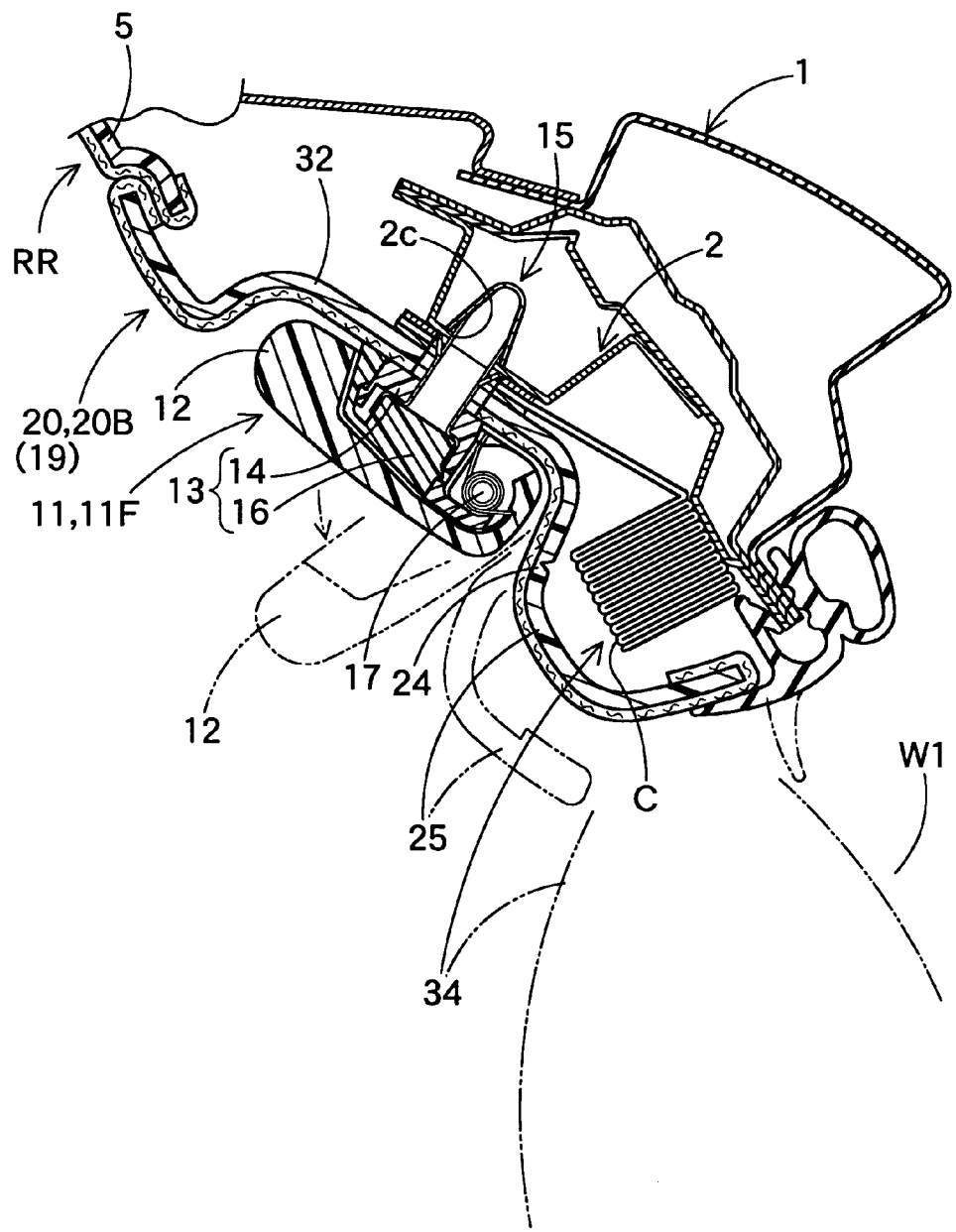
FIG. 5 is a sectional view taken along line V-V in FIG. 1.

Referring to FIGS. 1, 6, 11 and 14, the assist grips 11 (11F and 11B) are located in the interior I of the roof side rail RR in the upper periphery of side windows W1 and W2, i.e., in the arrangement area of the roof rail garnish 19. Each of the assist grips 11 includes an inversed-U shaped grip portion 12 for a vehicle occupant to hand-grip, and fixing portions 13 located in front and rear ends of the grip portion 12. Each of the fixing portions 13 includes a base 14, a retaining piece 15 and a cap 16. The base 14 is rotatably joined with an end of the grip portion 12 by a hinge mechanism 17. The hinge mechanism 17 is constructed such that its part located in one of the two fixing portions 13 of the assist grip 11 includes a damper mechanism, and the other part located in the other fixing portion 13 includes a spring member for helping the grip portion 12 to restore after turning. The grip portion 12, when in service, is pulled out toward the interior I by turning it around the position of the hinge mechanism 17, as indicated by double-dotted lines in FIG. 5.

Figure 6:
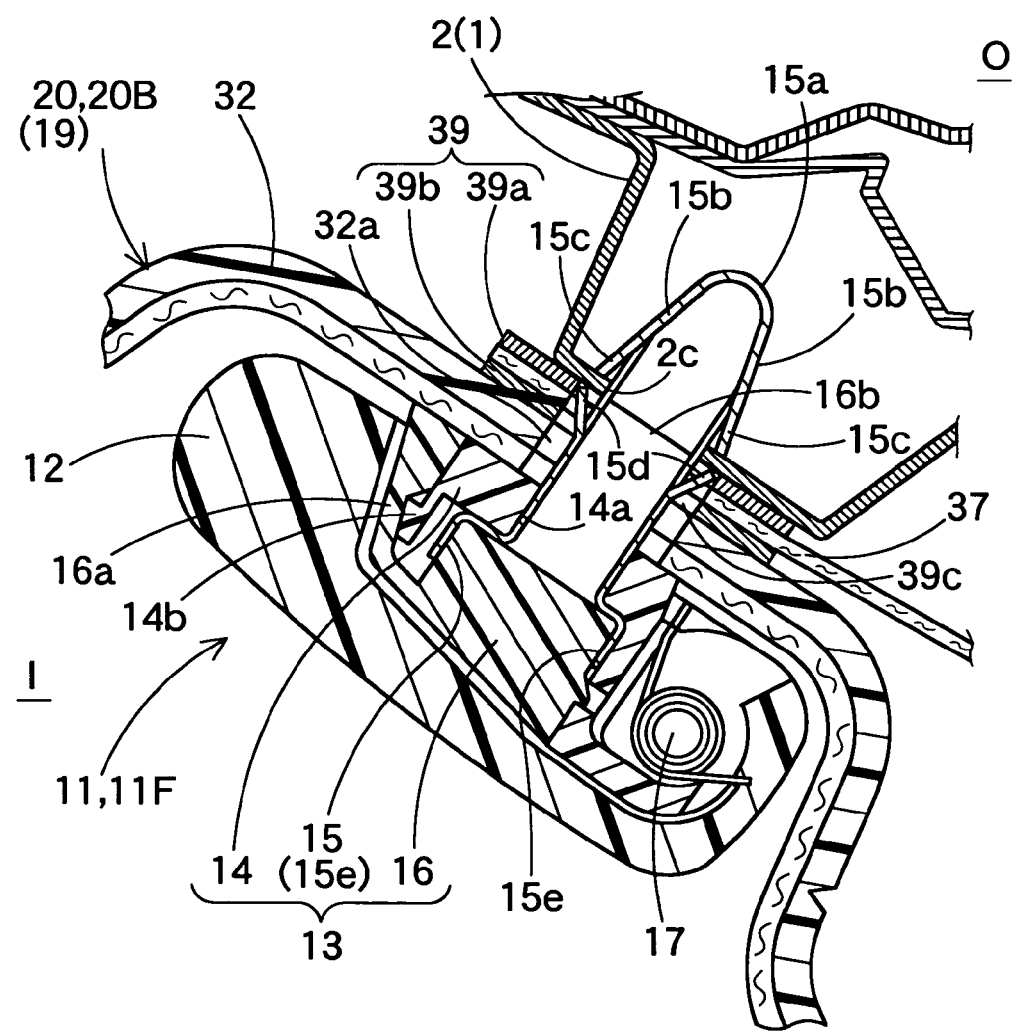
FIG. 6 is an enlargement of FIG. 5 showing the vicinity of an assist grip.
Figure 14:
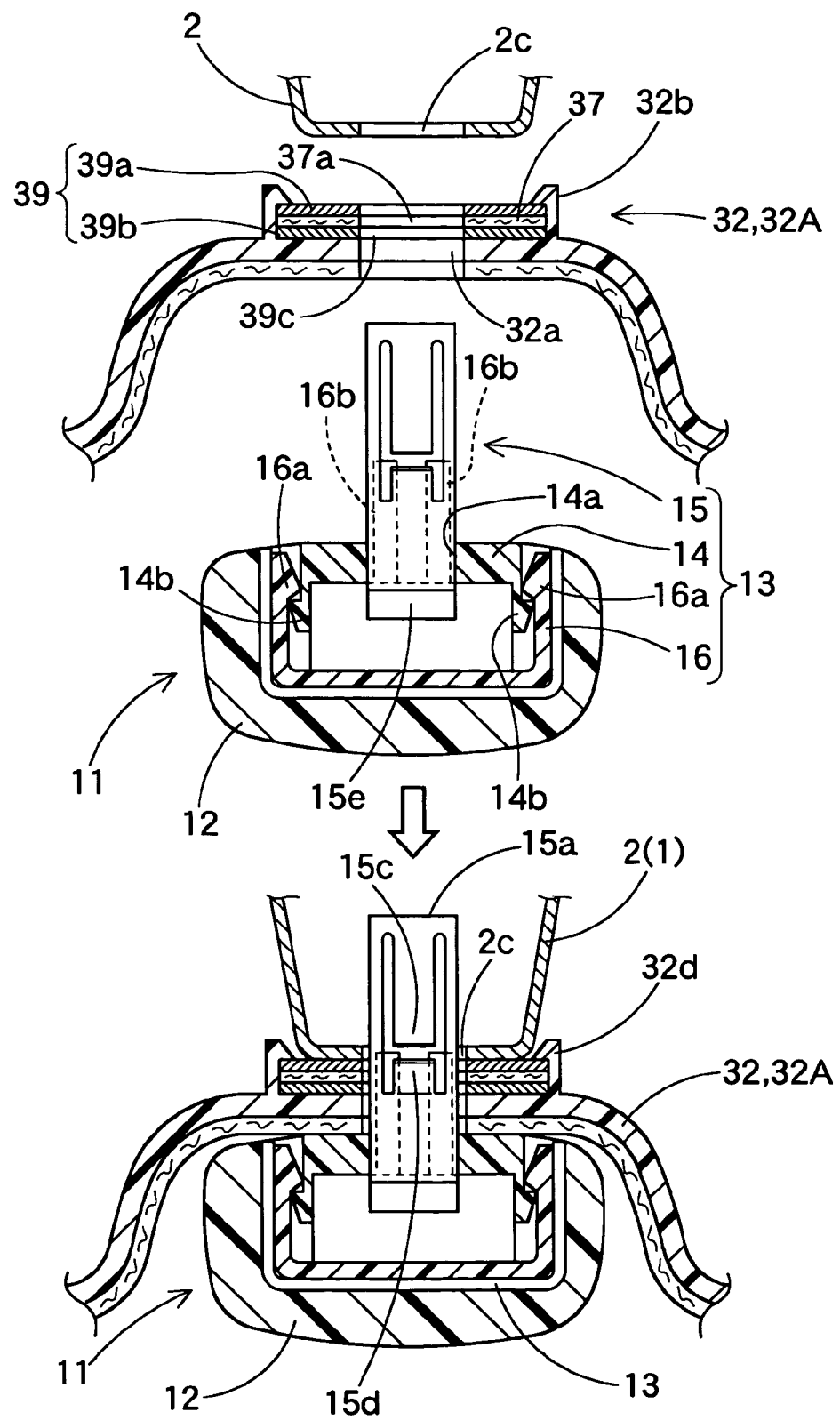
FIG. 14 is a sectional view illustrating the attachment process of the airbag module in FIG. 11 to the vehicle, which corresponds to line XIV-XIV in FIG. 11.

Referring to FIGS. 6 and 14, the base 14 is made from synthetic resin, and includes a hole 14a which opens in a rectangular shape through in the interior-exterior direction. The hinge mechanism 17 is located at the lower end of the base 14. The retaining piece 15 is put through the through hole 14a. In the interior I of the base 14 area plurality of retaining pawls 14b for retaining the cap 16.

The cap 16 made from synthetic resin is exposed in the vehicle's interior I when the grip portion 12 is turned and pulled out. The cap 16 includes an engaging portion 16a to be engaged with the retaining pawls 14b of the base 14, and a spacer 16b to be inserted in between side walls 15b of the retaining piece 15 upon engagement with the base 14. The spacer 16b is adapted to prevent the side walls 15b of the retaining piece 15 from approaching each other, and to stabilize the fixation of the retaining piece 15 to the inner panel 2.

The retaining piece 15 formed by bending a spring sheetmetal has a substantially U-shaped section with its leading end 15a rounded, and is bifurcated from the leading end 15a into the side walls 15b such that the side walls 15b confront each other. Each of the side walls 15b includes a retaining projection 15c which is raised by cutwork to project outwardly, and a holding projection 15d which is also raised outwardly by cutwork to confront the interior end of the retaining projection 15c. When the retaining piece 15 is inserted into the mounting hole 2c of the inner panel 2, the retaining projections 15c are once deformed to pass through the mounting hole 2c, and then spring back such that the periphery of the mounting hole 2c is positioned between the retaining projections 15c and the holding projections 15d. Consequently, the retaining piece 15 is secured to the inner panel 2 tightly by being suppressed from moving toward the interior I or exterior O. Ends 15e of the retaining piece 15 in the interior side I are adapted to serve as a grip portion for gripping when pulling the retaining piece 15 out of the mounting hole 2c such that the side walls 15b approach each other to shift the retaining projections 15c into the mounting hole 2c from the periphery of the mounting hole 2c.

When the side walls 15b are made to approach each other to remove the retaining piece 15 from the inner panel 2, the spacer 16b of the cap 16 positioned between the side walls 15b is pulled out of the space between the side walls 15b by removing the cap 16. By then removing the retaining piece 15, the assist grip 11 can be detached, so that the roof rail garnish 19 (or a later-described split part 20) and the airbag 34 can be detached from the inner panel 2.

Figure 11:
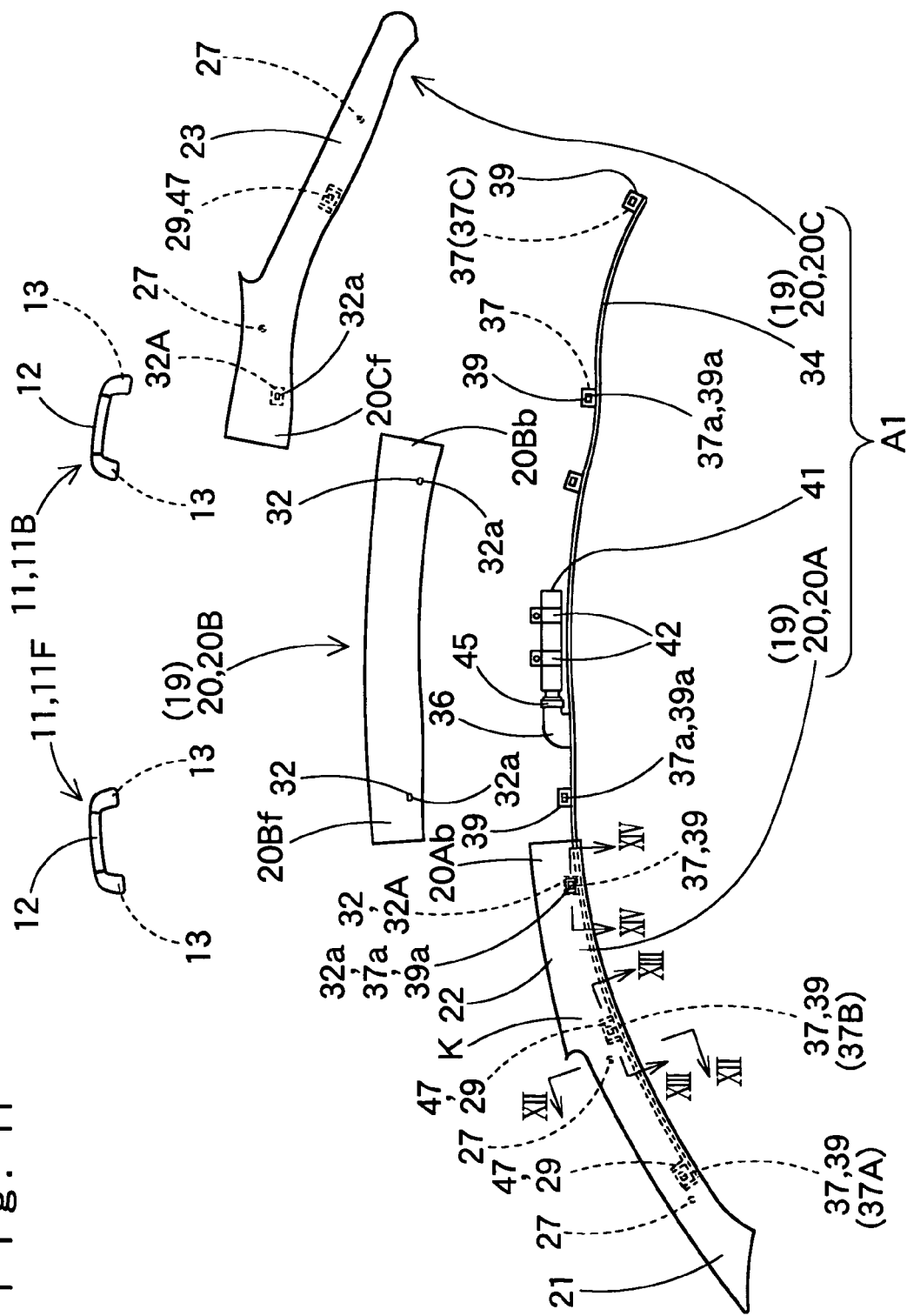
FIG. 11 is a front view of an airbag module of the airbag device in FIG. 1.

Referring to FIGS. 1 and 11, the roof rail garnish 19 is located between a roof head lining 5 and side windows W1 and W2. In the illustrated embodiment, the roof rail garnish 19 is located extendedly along upper periphery of side windows W1 and W2 inside the vehicle, from the front pillar FP to an upper part and rear edge of the rear pillar RP, via the roof side rail RR above the center pillar CP or a middle pillar. As shown in FIGS. 2, 3, 5, and 7 to 9, the roof rail garnish 19 is made from synthetic resin such as PC (polycarbonate)/ABS (Acrylonitrile butadiene styrene), polypropylene with filler, or thermo-plastic elastomer of olefin, with a skin, and is provided entirely along its lower edge with a door portion 25 that is pushed open by the airbag 34 upon deployment of the airbag 34. Along the upper edge of the door portion 25 is a thinned hinge line 24 for helping easy opening of the door portion 25. Although the illustrated embodiment show the garnish 19 having a skin on surface, the garnish may be constructed without a skin.

In consideration of a length of the garnish 19, the roof rail garnish 19 in the first embodiment is formed by split parts for easy handling. In the illustrated embodiment, the garnish 19 consists of three split parts 20 (20A, 20B and 20C) that are split up in the front-rear direction. The split parts 20A and 20B are split up at a position between the fixing portions 13 of the front assist grip 11F, while the split parts 20B and 20C are split up at a position between the fixing portions 13 of the rear assist grip 11B.

The split part 20A includes a front pillar garnish portion 21 for covering the entire area of the interior side I of the front pillar FP, and a roof side rail portion 22 that surpasses an intersection K of the front pillar FP and the roof side rail RR and extends up to the assist grip 11F located in a rear part of the side window W1 for the front seat. The split part 20B is located along the roof side rail RR between the assist grips 11F and 11B in the upper periphery of side windows W1 and W2, surpassing the center pillar CP. The split part 20C includes a rear pillar garnish portion 23 that extends rearward from the assist grip 11B to surpass the rear pillar RP, up to the rear periphery of the rear pillar RP.

Figure 7:
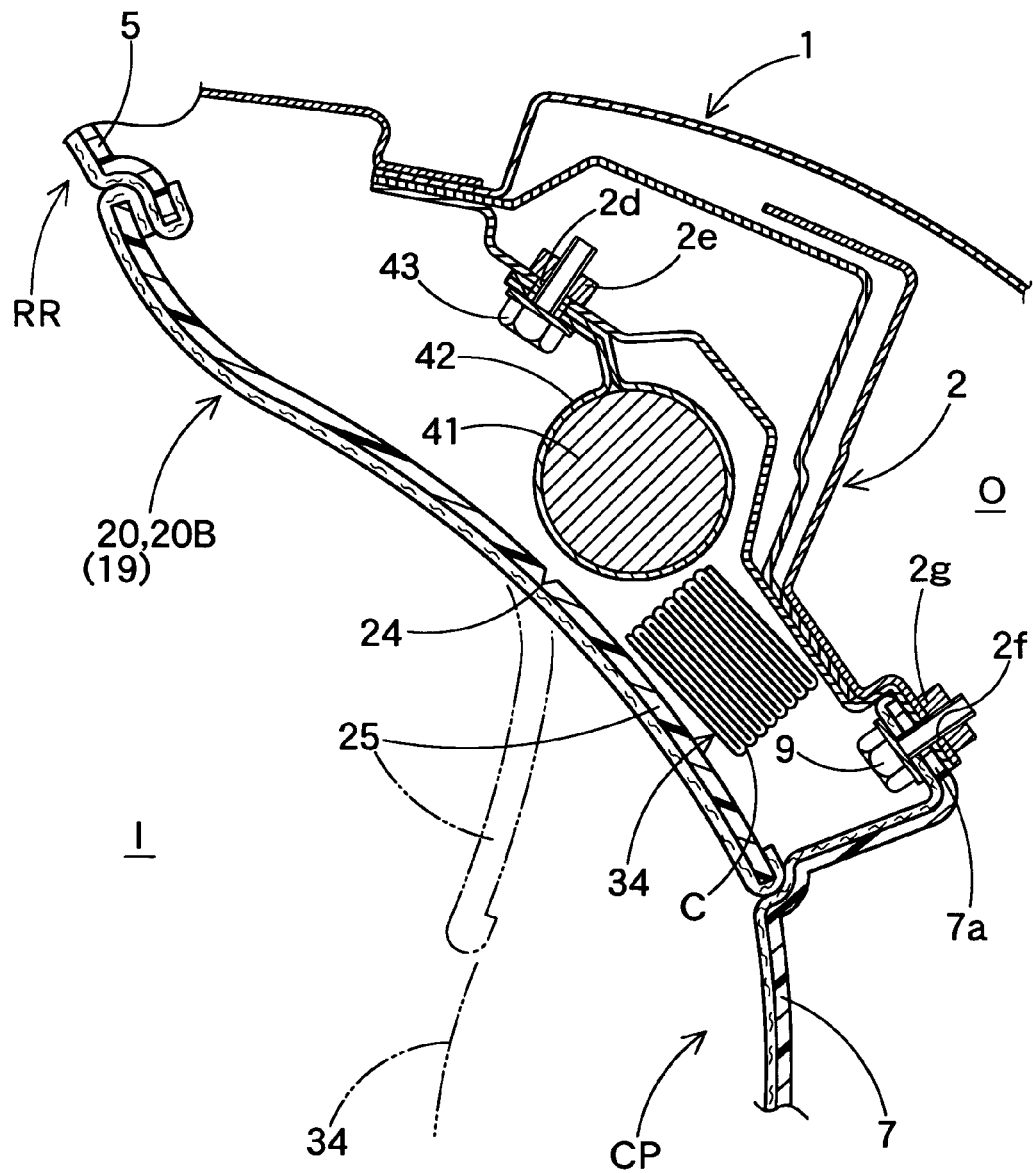
FIG. 7 is a sectional view taken along line VII-VII in FIG. 1.
Figure 8:
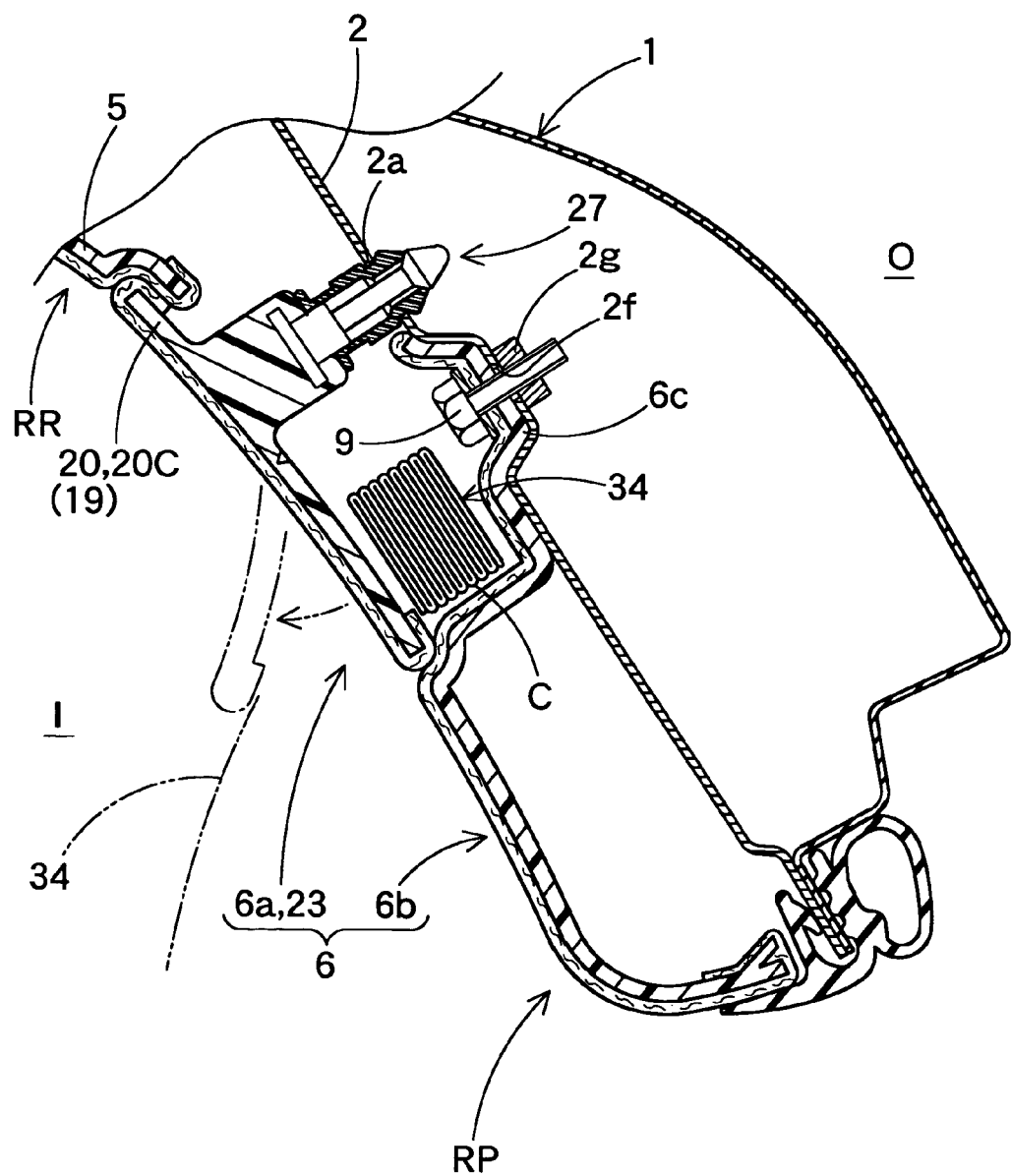
FIG. 8 is a sectional view taken along line VIII-VIII in FIG. 1.
Figure 9:
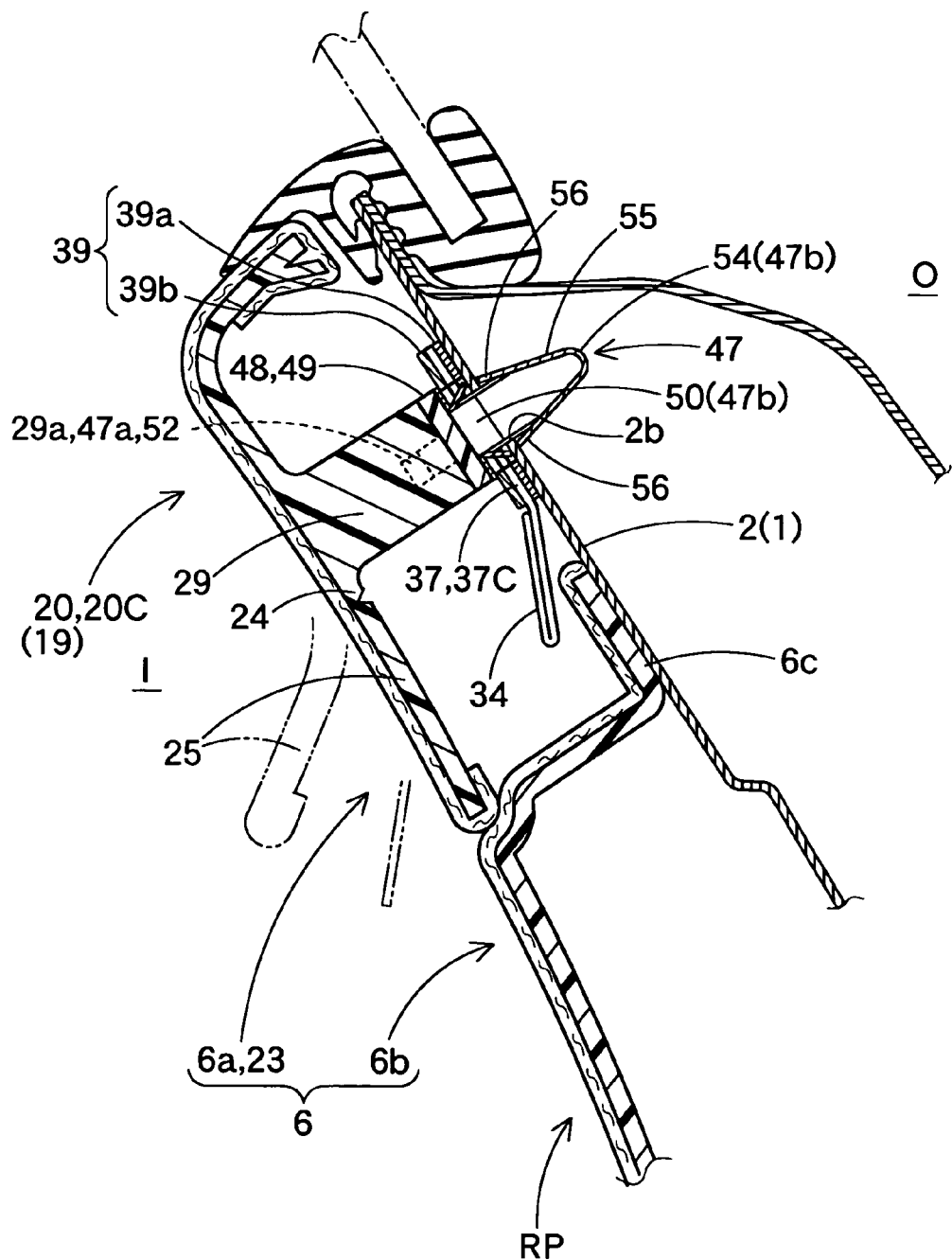
FIG. 9 is a sectional view taken along line IX-IX in FIG. 1.

In the first embodiment, as shown in FIGS. 1, 8 and 9, a rear pillar garnish 6 for covering the interior side I of the rear pillar RP includes an upper part 6a located in the upper and rear edge parts, i.e., the rear pillar garnish portion 23 of the split part 20C, and a lower part 6b fixed to the inner panel 2 in the rear pillar RP by mounting bolts 9 or the like. As shown in FIGS. 8 and 9, an upper edge part 6c of the lower part 6b extends from the interior I toward the exterior O, and then is secured to the inner panel 2 by a plurality of mounting bolts 9. The bolts 9 are fastened into nuts 2g provided in mounting holes 2f in the inner panel 2. In the meantime, in a center pillar garnish 7 for covering the interior side I of the center pillar CP, too, as shown in FIG. 7, its upper edge part 7c extends from the interior I toward the exterior O, and is secured to the inner panel 2 by the mounting bolts 9. These upper edge parts 6c and 7c enable the airbag 34 to securely deploy in the interior side I of the garnish lower part 6b and the garnish 7 upon deployment, not between the garnish lower part 6b or the garnish 7 and the inner panel 2.

As shown in FIGS. 1, 6, 11 and 14, each of the split parts 20A, 20B and 20C is provided at each position where the fixing portion 13 of the assist grip 11 is located with a mounting seat 32 (including 32A) having a through hole 32a through which the side walls 15b of the retaining piece 15 of the fixing portion 13 are inserted. Each of the mounting seats 32 is secured to the inner panel 2 with the periphery of the through hole 32a pressed by the base 14 of the fixing portion 13. As shown in FIG. 14, the mounting seats 32A located in a rear end portion 20Ab of the split part 20A and in a front end portion 20Cf of the split part 20C include respectively a plurality of retaining legs 32b for retaining the mounting portion 37 on which the mounting bracket 39 is applied, in addition to the through hole 32a. On the other hand, each of the mounting seats 32 located in a front end portion 20Bf and a rear end portion 20Bb of the split part 20B only includes a through hole 32a, but not retaining legs 32b. Retaining force of the retaining legs 32b against the bracket 39 is not so great as a retaining force of a later-described bag regulating portions 51 of the base 48 in the clip 47 in retaining the bracket 39 applied on the mounting portion 37 of the airbag 34.

As shown in FIGS. 1 to 4, 8, 9 and 11 to 13, the split parts 20A and 20C of the roof rail garnish 19 are provided at predetermined positions in the exterior side O with mounting members 27 and clips 47 for attaching the split parts 20A and 20C to the inner panel 2.

Figure 2:
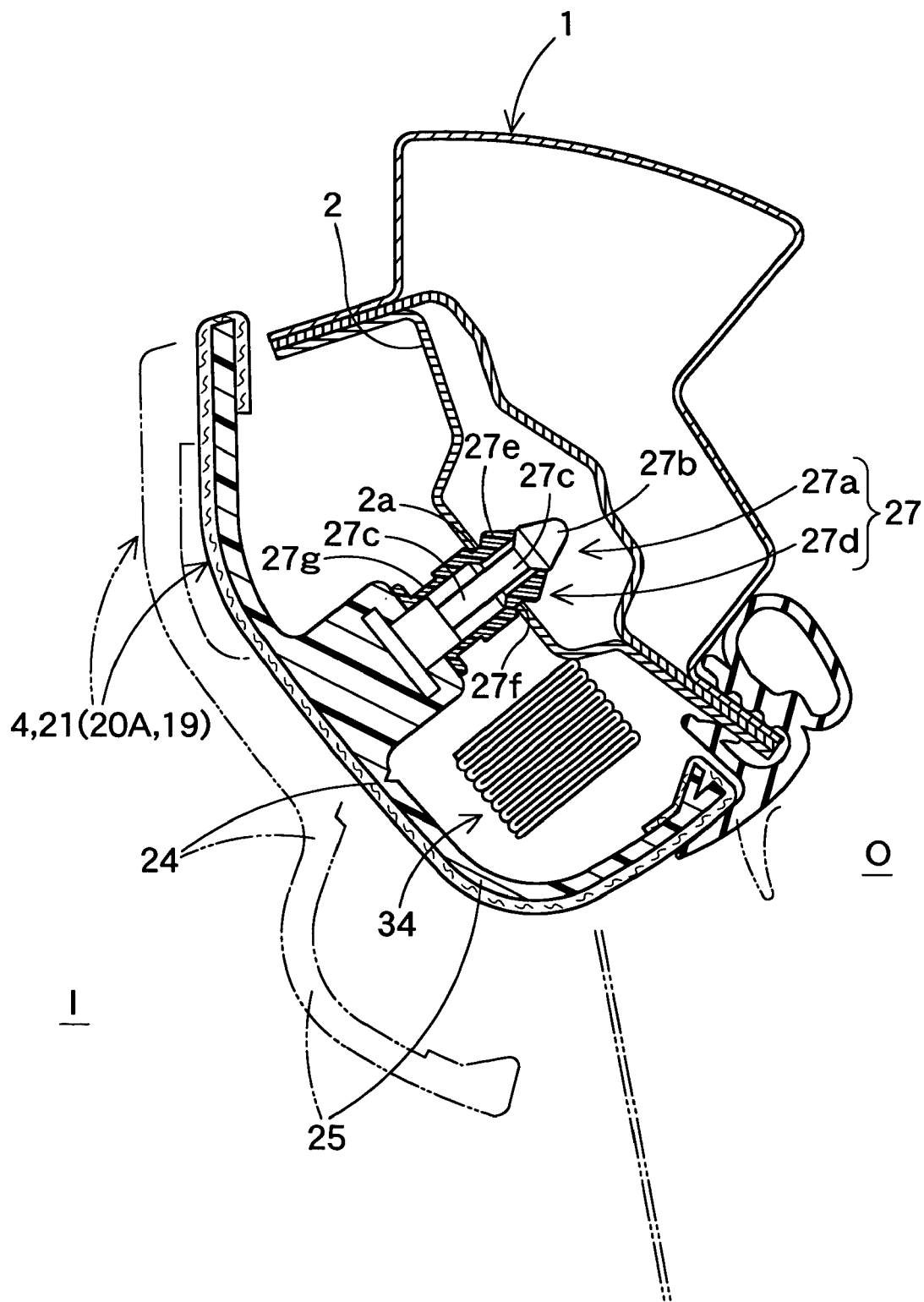
FIG. 2 is a sectional view taken along line II-II in FIG. 1.
Figure 3:
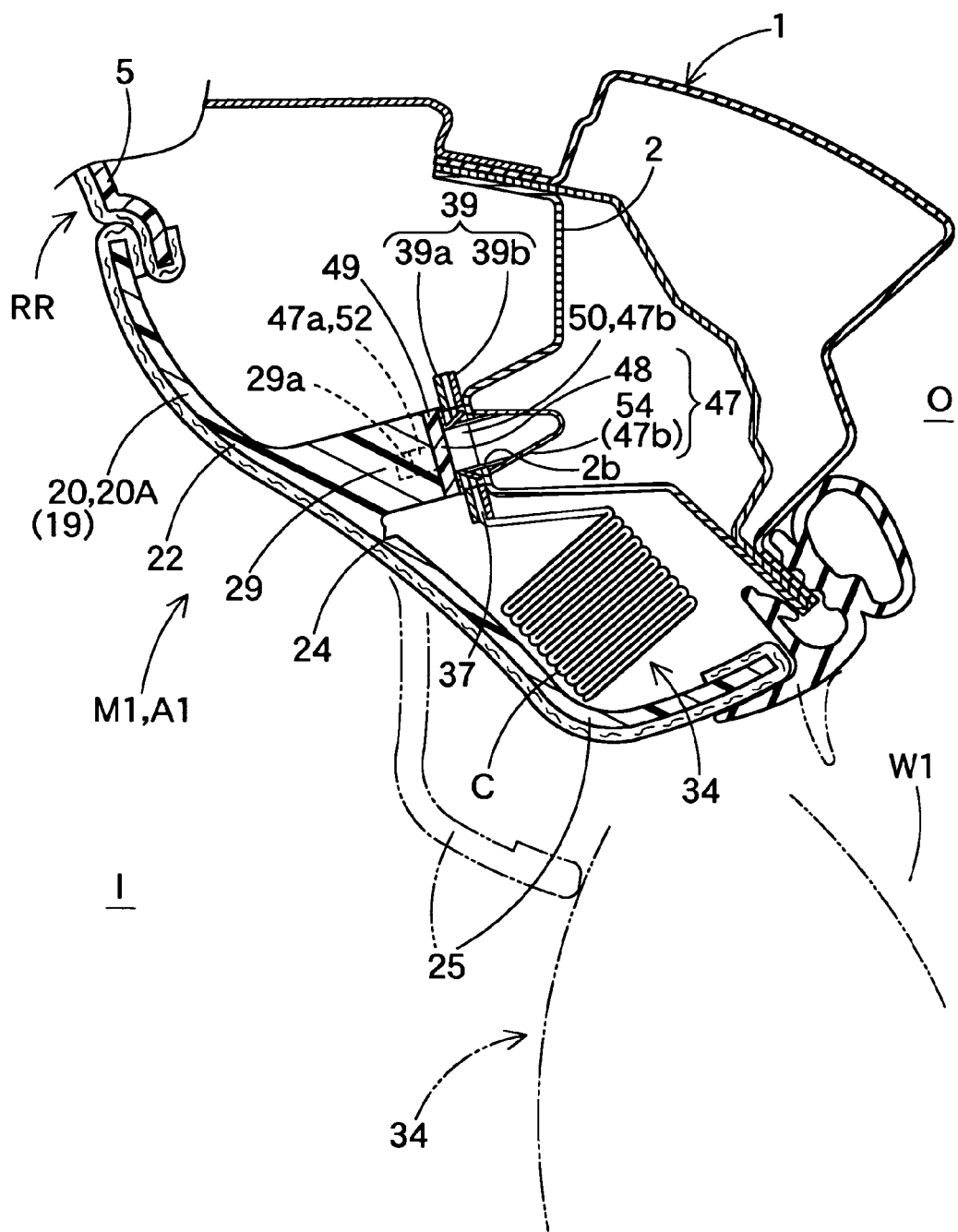
FIG. 3 is a sectional view taken along line III-III in FIG. 1.

As shown in FIGS. 2 and 12, each of the mounting members 27 includes a metal axis 27a embedded in the exterior side O of the roof rail garnish 19, and a cap 27d made from rubber or soft synthetic resin to cover the axis 27a. The axis 27a includes a neck portion 27c and a head 27b bulged in radius direction at the leading end of the neck portion 27c. The cap 27d has a substantially cylindrical shape capable of being retained by the head 27b, and is provided with a thick retaining portion 27e located at the leading end, a retaining recess 27f located in the outer circumference near a root part of the retaining portion 27e, and a U-groove 27g located in the outer circumference near a root part of the cap 27d. The mounting member 27 is secured to the inner panel 2 by being inserted into the mounting hole 2a of the inner panel 2 up to the position of the retaining recess 27f, with the axis 27a sheathed with the cap 27d, such that the cap retaining portion 27e held at the axis head 27b is retained by the exterior periphery of the mounting hole 2a. In this mounted state, even if the garnish 19 is pulled toward the interior I forcefully, only the garnish 19 shifts toward the interior I according to the plastic deformation of the cap retaining portion 27e, as shown in FIG. 12B, but the axis head 27b and the cap retaining portion 27e are not pulled out of the mounting hole 2a, so that the mounting member 27 is securely attached to the inner panel 2.

Figure 12A:
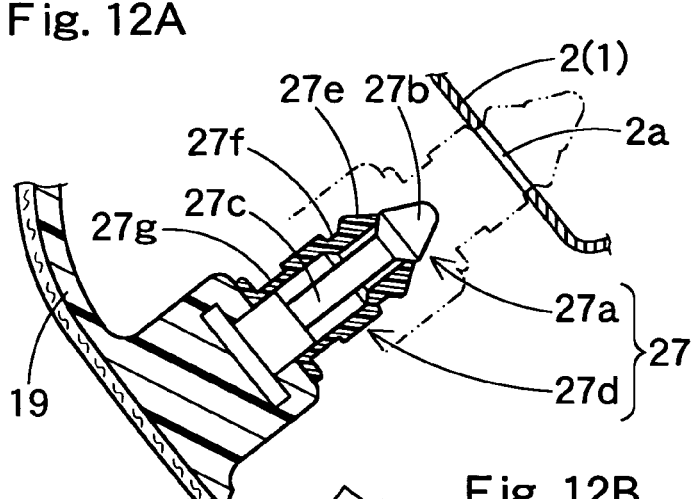
FIGS. 12A, 12B, 12C and 12D are sectional views illustrating an attachment process and removal process of the airbag module in FIG. 11 to/from the vehicle, which correspond to line XII-XII in FIG. 11.
Figure 12B:
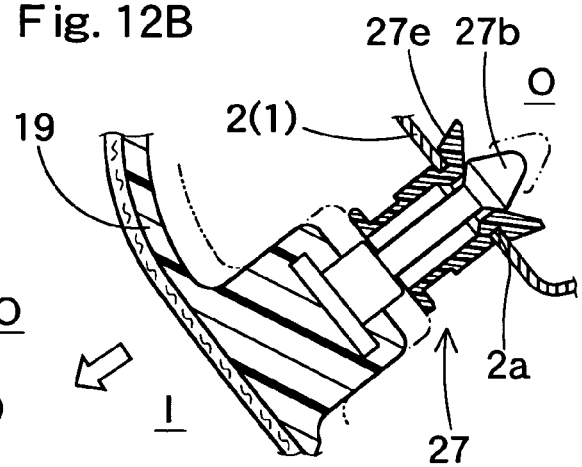
Figure 12C:
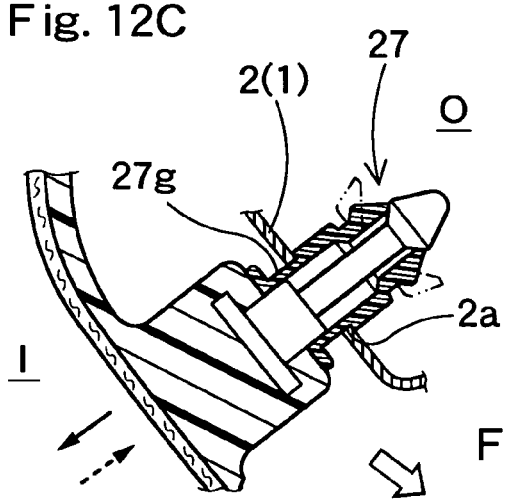

In occasions of removing the mounting member 27 from the inner panel 2 for maintenance and so on, the mounting member 27 is firstly pushed in toward the exterior O until the U-groove 27g of the cap 27d is positioned in the inner circumference of the mounting hole 2a (refer to FIG. 12C). Since the inner diameter of the cap 27d is predetermined such that the head 27b of the axis 27a may be pulled out of the cap 27d, the axis 27a can be then pulled out of the cap 27d and the mounting hole 2a while leaving the cap 27d retained in the periphery of the mounting hole 2a (refer to FIG. 12D). Thus the split parts 20A and 20C can be detached from the inner panel 2.

As shown in FIGS. 3, 4, 9, 13 and 15, each of the clips 47 includes a garnish side joint portion 47a detachably engaged with the roof rail garnish 19, and a body side joint portion 47b engaged with the vehicle body 1 in a state of holding the mounting portion 37 of the airbag 34 on which the mounting bracket 39 is applied. In the split parts 20A and 20C of the roof rail garnish 19 are connecting portions 29 for connecting the garnish side joint portions 47a of the clips 47 thereto. Each of the connecting portions 29 includes a recess 29a to which a hook-shaped garnish side engaging portion 52 constituting the garnish side joint portion 47a is engaged. Here, engaging force of the garnish side engaging portion 52 to the recess 29a is predetermined weaker than engaging force of the body side joint portion 47b of the clip 47 being engaged to the vehicle body 1 while holding the mounting portion 37 of the airbag 34 to the vehicle body 1.

Each of the clips 47 in the first embodiment includes a base 48 made of synthetic resin, and a retaining piece 54 made of spring sheetmetal having a similar shape to the retaining piece 15 of the assist grip 11.

More specifically, the retaining piece 54 includes two side walls 55 confronting each other formed by bending a band-shaped spring sheetmetal to have a substantially U-shaped section, retaining projections 56 extending outwardly from the side walls 55, and a bag holding portion 58. The bag holding portion 58 is located inward I than the retaining projections 56 in the side walls 55, and is inserted into the mounting hole 37a of the mounting portion 37 of the airbag 34 to hold the mounting portion 37 while preventing the mounting portion 37 from shifting inward I. Each of the retaining projections 56 is retained in the exterior periphery of the mounting hole 2b when the retaining piece 54 is inserted through the mounting hole 2b in the inner panel 2, and prevents the clip 47 from falling off inward I.

Each of the side walls 55 of the retaining piece 54 is further provided in the bag holding portion 58 with a holding projection 57 which is raised outwardly by cutwork to confront the interior end of the retaining projection 56, as in the retaining piece 15. Accordingly, as the retaining piece 15, when the retaining piece 54 is inserted into the mounting hole 2b of the inner panel 2, the retaining projections 56 are once deformed to pass through the mounting hole 2b, and then spring back such that the periphery of the mounting hole 2b is positioned between the retaining projections 56 and the holding projections 57. Consequently, the retaining piece 54 is secured to the inner panel 2 tightly by being suppressed from moving toward the interior I or exterior O, and secures the split part 20A or 20C to the inner panel 2 together with the mounting portion 37 of the airbag 34 on which the bracket 39 is applied.

Referring to FIGS. 13 and 14, the bag holding portion 58 is located inward I than the retaining projections 56, and has such a L-shaped section expanding outward at its interior end as not to shift the mounting portion 37 inward I. A portion extending inward I from an outer edge of the holding portion 58 constitutes a grip portion 59. A plate-shaped root portion 49 of the base 48 is fitted in between the grip portions 59.

The bag holding portion 58 is constructed such that an exterior O side of the outer plate 39a of the mounting bracket 39 substantially abuts against an interior I side of the inner panel 2 when the mounting portion 37 of the airbag 34 on which the bracket 39 is applied is suppressed from shifting inward I by being applied on a vertical wall 58a of the holding portion 58, and the retaining piece 54 is retained by the mounting hole 2b.

The base 48 includes a root portion 49, a spacer 50, a bag regulating portion 51 and a garnish side engaging portion 52. The root portion 49 has a substantially square plate shape, and is fitted in between the grip portion 59 such that vertical ends of the root portion 49 abut against the grip portion 59. The spacer 50 includes two plates projected outward O from an exterior side O of the root portion 49, and is so inserted in between the side walls 55 of the retaining piece 54 as to prevent the side walls 55 from approaching each other, so that the retaining projections 56 and the holding projections 57 are prevented from shifting into the mounting hole 2b of the inner panel 2. The bag regulating portion 51 is projected outward O from the exterior side O of the vicinity of front and rear edges of the root portion 49, and is adapted to regulate the outward movement of the mounting portion 37 held by the bag holding portion 58, when the spacer 50 is inserted in between the side walls 55. In the illustrated embodiment, the regulating portion 51 is constituted by hooks that detachably retain outer edges of the outer plate 39a of the mounting bracket 39. The garnish side engaging portion 52 is adapted to be engaged with the connecting portion 29 in the roof rail garnish 19 (or the split parts 20A or 20C), and is constituted by hooks that are projected inward I from the vicinity of front and rear edges of the root portion 49 to be engaged with the recesses 29a.

Here, the garnish side engaging portion 52 of the base 48 constitutes the garnish side joint portion 47a of the clip 47. The body side joint portion 47b of the clip 47 is constituted by the retaining piece 54, the spacer 50 of the base 48, and the bag regulating portion 51 of the base 48.

The bag regulating portion 51 of the base 48 can be detached inward I from the mounting portion 37 (i.e., the base 48 can be detached from the retaining piece 54) at the time the holding portion 58 holds the mounting portion 37 only when a greater force is applied than a force to stop engagement of the base 48 and the connecting portion 29 of the garnish 19 in the garnish side joint portion 47a (or the garnish side engaging portion 52). That is, after the garnish side engaging portion 52 of the clip 47 is engaged with the connecting portion 29 of the garnish 19, and the retaining piece 54 of the clip 47 is retained by the mounting hole 2b of the inner panel 2 in a condition that the mounting portion 37 of the airbag 34 is held by the bag holding portion 58 while being prevented from moving outward O by the bag regulating portion 51, if the garnish 19 is pulled inward I forcefully, the connecting portion 29 is detached from the garnish side engaging portion 52 of the clip 47 firstly, but the retaining piece 54 is not pulled out of the mounting hole 2b. If then the base 48 is pulled inward I even more forcefully, the hook-shaped bag regulating portion 51 is detached from the outer plate 39a of the bracket 39 while leaving the retaining projections 56 of the retaining piece 54 retained by the mounting hole 2b, so that the base 48 is detached from the retaining piece 54 which is still retained by the inner panel 2 while holding the mounting portion 37 by the bag holding portion 58.

To mount the head-protecting airbag device M1 on the vehicle, the airbag 34, the mounting brackets 39 and 42, the inflator 41, and the split parts 20A and 20C of the roof rail garnish 19 are assembled into an airbag module A1, firstly, as shown in FIG. 11. FIG. 11 shows a condition in which the split part 20C is separated from the airbag 34. When the airbag module A1 is formed, the airbag 34 is folded up firstly. As shown in FIG. 10, the airbag 34 is bellows-folded, from flat expanded, and deflated state, on crest and valley folds C (as referred to FIGS. 5, 7, 8 and 10), so that its lower edge 34b is brought closer to the upper edge 34a. After folding up, an unillustrated breakable tape member is wound around the folded airbag 34 at predetermined intervals for keeping the folded-up configuration. In the meantime, the mounting brackets 39 are attached to the individual mounting portions 37, and the inflator 41 with the bracket 42 attached thereto is joined with the joint port 36 by the cramp 45.

Subsequently, the spacer 50 of the base 48 in each of the clips 47 is located between the side walls 55 of each of the retaining piece 54, and the retaining piece 54 is inserted into each of the mounting portions 37 (37A, 37B and 37C) located in front and rear end parts of the airbag 34 and each of the through holes 39a of the mounting bracket 39 applied thereon, from the leading end 54a, such that the vertical wall 58a of the bag holding portion 58 abuts against the inner plate 39b of the mounting bracket 39, and then the bag regulating portion 51 is hooked on the outer plate 39a. Now each of the mounting portions 37 (37A, 37B and 37C) of the airbag 34 is held from moving toward exterior O by the bag regulating portion 51 of the base 48, and held from moving toward interior I by the bag holding portion 58 of the retaining piece 54, and thus is retained by the bag holding portion 58 of the retaining piece 54. In this state, as shown in FIGS. 13A and 13B, the individual clips 47 are joined with the split parts 20A and 20C of the garnish 19 by having each of the garnish side engaging portions 52 (or the garnish side joint portions 47a) engaged with each of the connecting portions 29 of the split parts 20A and 20C. In the meantime, predetermined mounting brackets 39 are attached to the corresponding mounting seats 32A by the retaining legs 32b. Consequently, the airbag 34, the mounting brackets 39 and 42, the inflator 41, the split parts 20A and 20C, and the clips 47 are assembled into the airbag module A1. In the mounting members 27 of the split parts 20A and 20C, the caps 27d are attached to the axes 27a.

Figure 4:
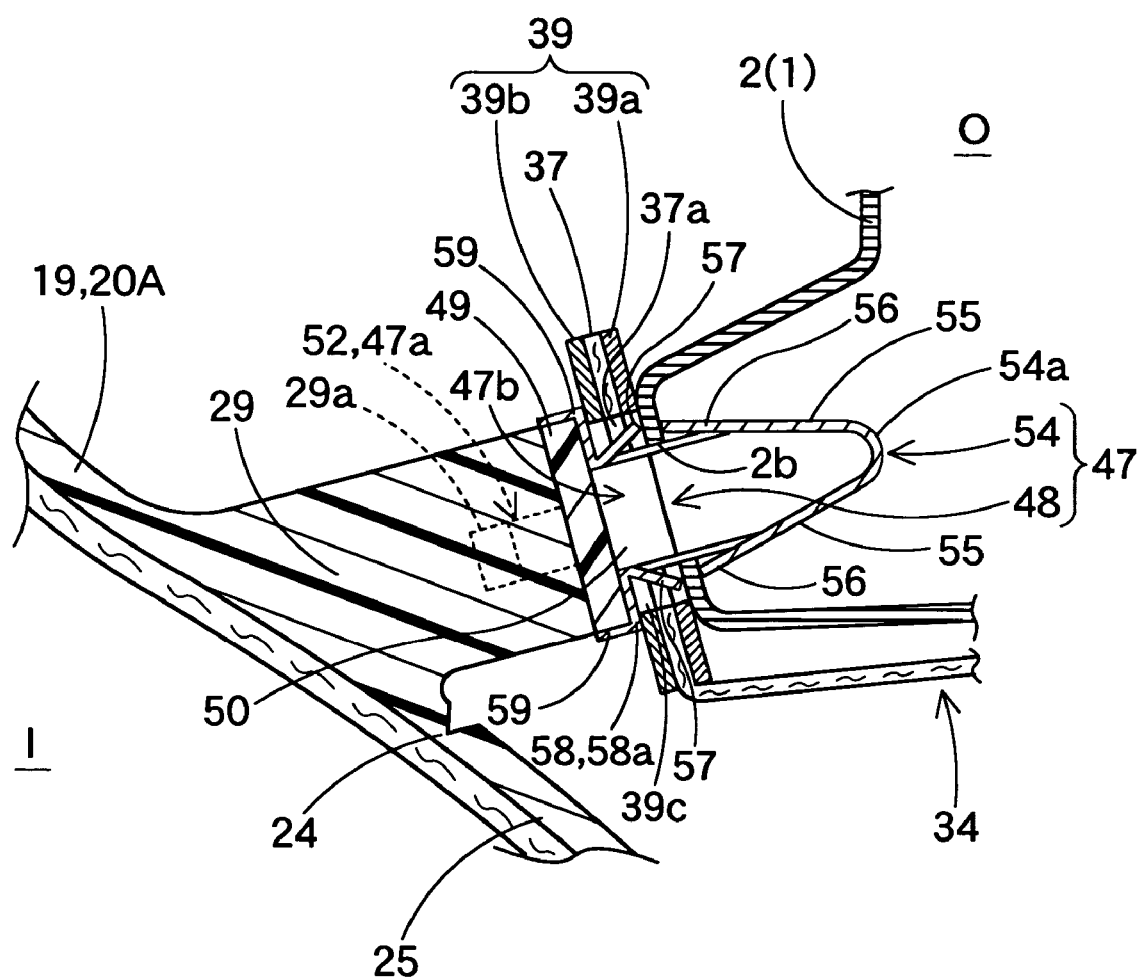
FIG. 4 is a partial enlarged section of FIG. 3 showing a fixed state of a roof rail garnish.

Then, the split part 20B and the assist grips 11 (11F and 11B) are mounted on the vehicle together with the airbag module A1. At this time, the airbag module A1 is mounted on the vehicle firstly. More specifically, each of the mounting members 27 of each of the split parts 20A and 20C, in which the axis 27a is sheathed with the cap 27d, is inserted into the mounting hole 2a in the inner panel 2 up to the position of the retaining recess 27f such that the cap retaining portion 27e held at the axis head 27b is retained by the exterior periphery of the mounting hole 2a. Thus each of the mounting members 27 is attached to the inner panel 2. As to each of the clips 47, when each of the retaining pieces 54 is inserted into the mounting hole 2b, the retaining projections 56 are once deformed to pass through the mounting hole 2b, and then spring back such that the periphery of the mounting hole 2b is positioned between the retaining projections 56 and the holding projections 57, as shown in FIGS. 4 and 13C. Consequently, the clips 47 are secured to the inner panel 2 tightly by being suppressed from moving toward the interior I or exterior O, together with the mounting portion 37 (37A, 37B and 37C) of the airbag 34 held by the bag holding portions 58. In the meantime, the mounting brackets 42 holding the inflator 41 are bolt 43 fixed to the inner panel 2.

Subsequently, the split part 20B is located at a predetermined position of the inner panel 2, and the retaining pieces 15 of the fixing portions 13 in the assist grips 11F and 11B are inserted through the through holes 32a of the mounting seats 32 or 32A in each of the split parts 20A, 20B and 20C, the through holes 39c of the mounting brackets 39, and the mounting holes 37a of the mounting portions 37, and then into the mounting holes 2c of the inner panel 2, and held thereat. Thus the fixing portions 13 hold the mounting seats 32 and 32A and the mounting brackets 39, and secure the peripheries of the mounting seats 32 of the split parts 20A, 20B and 20C and the airbag 34 to the inner panel 2. Thus the head-protecting airbag device M1 is mounted on the vehicle.

In mounting the airbag device M1 on the vehicle, an unillustrated wire extending from a control device for inputting actuating signals is connected to the inflator 41. Before attaching the airbag device M1, the center pillar garnish 7 and the lower part 6b of the rear pillar garnish 6 are attached to the vehicle body 1 by bolts 9 and so on, and the roof head lining 5 is also attached to the vehicle.

When the inflator 41 is actuated after the airbag device M1 is mounted on the vehicle, inflation gas is discharged from the inflator 41, and flows into the gas admissive portion 35 of the airbag 34 via the joint port 36. The airbag 34 then inflates and breaks the tape member, pushes and opens the door portion 25 of the roof rail garnish 19, and deploys to cover the side windows W1 and W2.

In such an occasion as replacing the roof rail garnish 19 after the airbag device M1 is mounted on the vehicle, the split part 20B is detached from the vehicle body 1 firstly by removing the assist grips 11 from the body 1. To remove each of the assist grips 11, as shown in FIGS. 16A and 16B, the grip portion 12 is turned inward I, and then the cap 16 of each of the fixing portions 13 is removed from the base 14. Then the spacer 16b is removed from a space between the side walls 15b of the retaining piece 15, which makes the grip portion 15e grippable. If then the side walls 15b are brought closer to each other by gripping the grip portion 15e, as indicated by double-dotted lines in FIG. 16B, the retaining projections 15c are shifted into the mounting hole 2c from the periphery of the hole 2c. Then the retaining piece 15 can be pulled out of the mounting hole 2c, and thus the base 14 of the assist grip 11 is detached from the inner panel 2. After detaching the assist grips 11F and 11B from the inner panel 2, the split part 20B of the roof rail garnish 19 is easily detached from the inner panel 2. Here, since the mounting seats 32 in the split part 20B are not provided with the retaining legs 32b, the split part 20B is detached from the body 1 without being affected by the airbag 34.

Figure 12D:
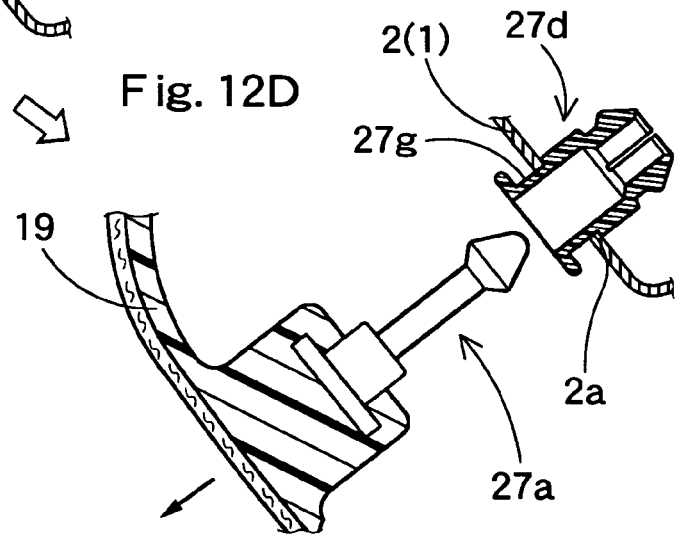
Figure 15A:
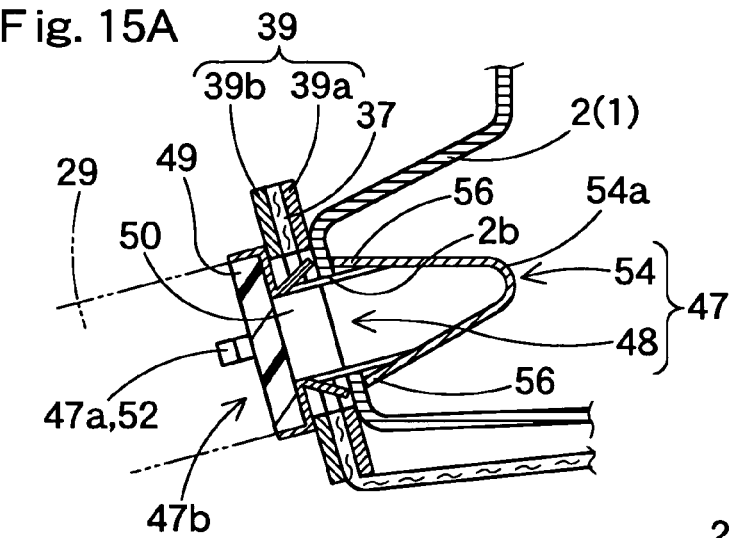
FIGS. 15A, 15B and 15C illustrate a removal process of a clip of the airbag module in FIG. 11 from the vehicle body.

Subsequently, the split parts 20A and 20C of the roof rail garnish 19 are removed. As shown in FIG. 12C, in the individual mounting members 27, each of the mounting members 27 is pushed in toward exterior O until the U-groove 27g of the cap 27d is positioned in the inner circumference of the mounting hole 2a. In the individual clips 47, as shown in FIGS. 13C, 13D, and 15A, if the split parts 20A and 20C are pulled toward interior I, the recesses 29a of the connecting portion 29 are released from the connection with the garnish side engaging portion 52 of the clip 47, so that the split parts 20A and 20C are detached from the inner panel 2. In each of the mounting members 27, too, if the split parts 20A and 20C are pulled toward interior I, the axis 27a can be pulled out of the cap 27d and the mounting hole 2a while leaving the cap 27d retained in the periphery of the mounting hole 2a, as shown in FIG. 12D.

At this time, in the split parts 20A and 20C, the mounting portions 37 of the airbag 34 and the mounting brackets 39 are at first attached to the mounting seats 32A by the retaining legs 32b. However, since the body side joint portions 47b of the clips 47 tightly secure the mounting portions 37 of the airbag 34 to the vehicle body 1, the retaining legs 32b having a weak retaining force stop the retention easily when the split parts 20A and 20C are detached from the inner panel 2. Consequently, the mounting portions 37 of the airbag 34 and the mounting brackets 39 are separated from the mounting seats 32A, and remain in the vehicle body 1.

When the individual split parts 20A, 20B and 20C of the roof rail garnish 19 are detached from the vehicle body 1, replacing split parts 20A, 20B and 20C are attached to the vehicle body 1 in an inverse process to the detachment. The caps 27d remaining in the inner panel 12 are put on axes 27a of the new garnish 19.

Figure 15B:
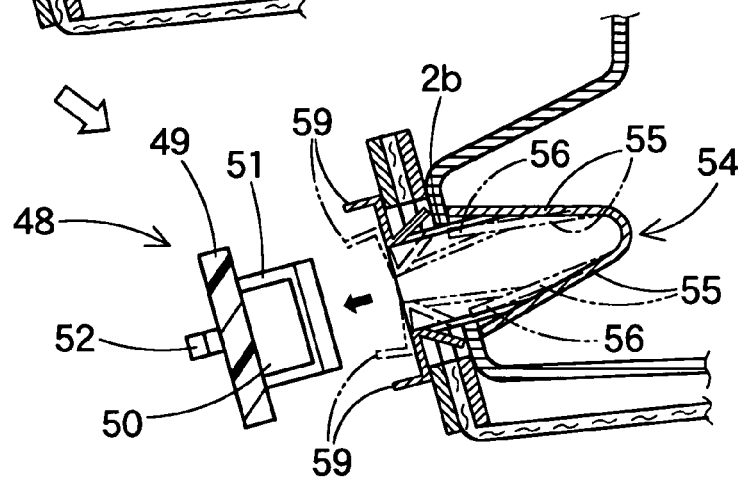
Figure 15C:
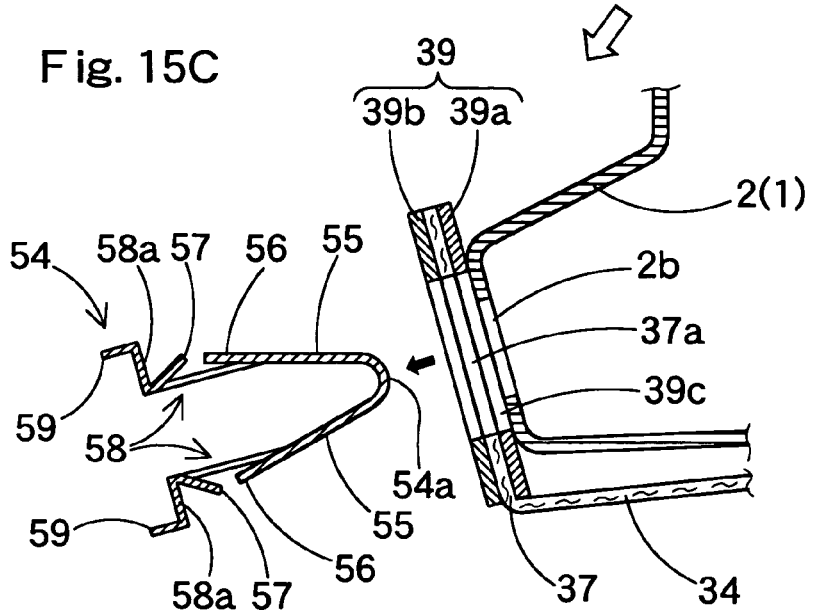
Figure 17:
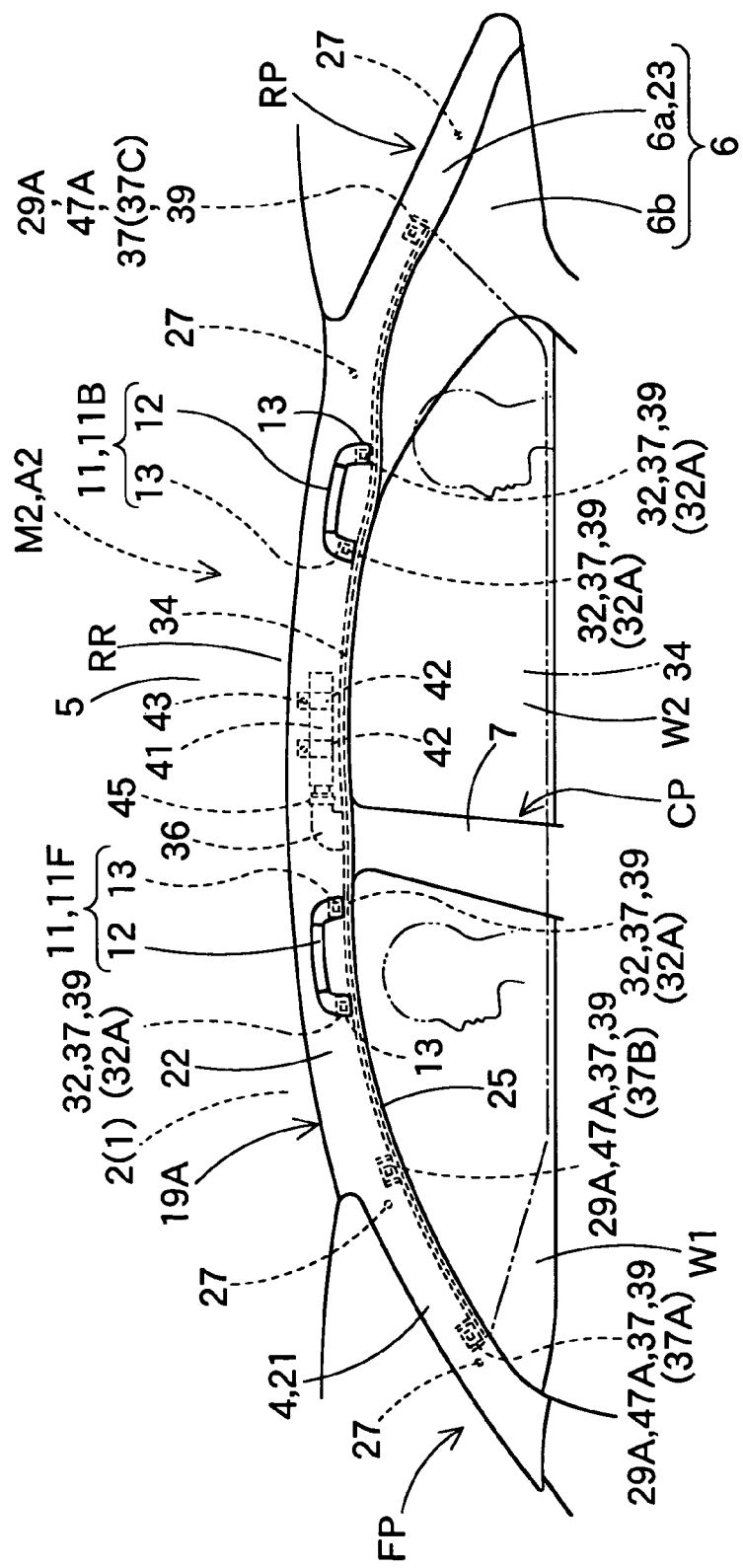
FIG. 17 is a front view of a second embodiment of the head-protecting airbag device of the present invention, as viewed from the vehicle's interior.

To remove the airbag 34 after detaching the split parts 20A, 20B and 20C of the roof rail garnish 19 from the vehicle body 1, the base 48 of each of the clips 47 is pulled toward interior I forcefully, as shown in FIGS. 15A and 15B. Then the hook-shaped bag regulating portion 51 is taken off from the outer plate 39a of the bracket 39 while the retaining projections 56 of the retaining piece 54 are retained in the periphery of the mounting hole 2b, so that the base 48 is detached from the retaining piece 54 that is still retained by the inner panel 2 while holding the mounting portion 37 by the bag holding portions 58, and the spacer 50 is also removed from a space between the side walls 55. Thereafter, if the grip portion 59 of the retaining piece 54 in each of the clips 47 is gripped to bring the side walls 55 of the retaining piece 54 close to each other as indicated by double-dotted lines in FIG. 15B, the retaining projections 56 and the holding projections 57 are shifted into the mounting hole 2b from the periphery of the hole 2b, so that the retaining piece 54 is pulled out of the mounting hole 2b. Then as shown in FIG. 15C, the retaining piece 54 is removed from the inner panel 2, and the mounting portion 37 with the bracket 39 is detached from the inner panel 2.

To detach the inflator 41 from the vehicle body 1, the mounting brackets 42 are removed from the inner panel 2 by loosening bolts 43.

As thus described, in the first embodiment of the head-protecting airbag device M1 of the present invention, the airbag module A1 is mounted on a vehicle if the body side joint portions 47b is joined to the vehicle body 1 by having the mounting portions 37 of the airbag 34 on which the brackets 39 are applied held by the bag holding portions 58 of the body side joint portions 47b of the clips 47, and by having the retaining projections 56 of the retaining pieces 54 in the clips 47 retained in the mounting holes 2b.

In each of the clips 47, the engaging force of the garnish side joint portion 47a to the connecting portion 29 of the split parts 20A and 20C is predetermined weaker than the engaging force of the body side joint portion 47b against the vehicle body 1. Accordingly, in such an occasion of maintenance, if the clips 47 in the split parts 20A and 20C are pulled toward interior I forcefully, only the split parts 20A and 20C are detached while leaving the mounting portions 37 of the airbag 34 retained by the vehicle body 1, so that the roof rail garnish 19 is replaceable.

In the head-protecting airbag device M1, therefore, maintenance of the roof rail garnish 19 is facilitated since only the garnish 19 can be detached after the airbag module A1 is mounted on the vehicle.

In the body side joint portion 47b of each of the clips 47, the mounting portion 37 of the airbag 34 is detachable from the vehicle body 1 if, after detaching the roof rail garnish 19 from the inner panel 2, the spacer 50 of the base 48 is removed from a space between the side walls 55 of the retaining piece 54 while the bag regulating portion 51 is taken off from the outer plate 39a of the bracket 39, and then the retaining piece 54 is pulled out of the mounting hole 2b. Accordingly, the mounting portions 37 of the airbag 34 are detachable from the vehicle body 1 after detaching the garnish 19, so that the airbag 34 is also replaceable, and maintenance of the whole head-protecting airbag device M1 is facilitated.

In the first embodiment, moreover, the airbag 34 is stably held utilizing the clips 47 each including above-mentioned base 48 and retaining piece 54, whose maintenance is easy.

To paraphrase, in each of the clips 47 in the first embodiment, the spacer 50 of the base 48 is located between the side walls 55 of the retaining piece 54, and the retaining piece 54 is inserted into the mounting portion 37 of the folded airbag 34 on which the bracket 39 is applied thereon. Thus each of the mounting portions 37 of the airbag 34 is held from moving toward exterior O by the bag regulating portion 51 of the base 48, and held from moving toward interior I by the bag holding portion 58 of the retaining piece 54, and is retained by the bag holding portion 58 of the retaining piece 54. In this state, subsequently, if the individual clips 47 are joined with the split parts 20A and 20C of the garnish 19 by having each of the garnish side engaging portions 52 (or the garnish side joint portions 47a) engaged with each of the connecting portions 29 of the split parts 20A and 20C, the airbag module A1 is formed. Thereafter, if each of the retaining pieces 54 is inserted into the mounting hole 2b in the vehicle body 1, the retaining projections 56 are once deformed to pass through the mounting hole 2b, and then spring back to be retained in the exterior periphery of the mounting hole 2b, and prevented from being pulled out inward I. Consequently, the split parts 20A, 20C, and the mounting portions 37 of the airbag 34 are tightly secured to the vehicle body 1 utilizing the clips 47.

Thereafter, in such an occasion as maintenance, if the split parts 20A and 20C are pulled toward interior I forcefully, in each of the clips 47, the garnish side engaging portion 52 as the garnish side joint portion 47a stops the joinder with the recesses 29a in the connecting portion 29 of the garnish 19, so that the split parts 20A and 20C are detached from the vehicle body 1. At this time, the spacer 50 remains between the side walls 55 of the retaining piece 54, so that the retaining piece 54 is not pulled out of the mounting hole 2b of the body 1, and the bag holding portion 58 keeps holding the mounting portion 37 of the airbag 34.

This means that each of the clip 47 is able to retain the mounting portions 37 of the airbag 34 to the vehicle body 1 stably even if the garnish side engaging portion 52 as the garnish side joint portion 47a stops the joinder with the split parts 20A or 20C of the garnish 19 upon deployment of the airbag 34. Therefore, even if the split parts 20A and 20C come off from the body 1 in positions of the clips 47 upon deployment of the airbag 34, the airbag 34 remains attached to the vehicle body 1 by the clips 47, and is able to deploy stably. If the roof rail garnish 19 is detached from the vehicle body 1 by separation of the engaging portions 52 and the connecting portions 29, an opening of the door portion 25 of the garnish 19 is broadened, so that the airbag 34 is able to deploy smoothly from the broadened opening.

In such an occasion as maintenance, in the body side joint portion 47b of each of the clips 47, the mounting portion 37 of the airbag 34 is detachable from the vehicle body 1 if, after detaching the split parts 20A and 20C from the vehicle body 1, the spacer 50 of the base 48 is removed from a space between the side walls 55 of the retaining piece 54 while the bag regulating portion 51 is taken off from the outer plate 39a of the bracket 39, the retaining projections 56 are shifted into the mounting hole 2b, and the retaining piece 54 is pulled out of the mounting hole 2b toward interior I. Accordingly, the mounting portions 37 of the airbag 34 are detachable from the vehicle body 1, so that the airbag 34 is in condition for being taken care of.

Therefore, the clips 47 of the first embodiment is able to hold the airbag 34 stably while securing easy maintenance of the split parts 20A, 20B and the airbag 34.

In the first embodiment, the clip 47 which is constructed by the base 48 and the retaining piece 54 in advance is attached to each of the mounting portions 37 of the airbag 34 on which the bracket 39 is applied, and then the engaging portion 52 of the base 48 and the connecting portion 29 are connected to form the airbag module A1. However, it will also be appreciated that only the base 48 is engaged with the connecting portion 29 of the garnish 19 firstly while the retaining piece 54 is inserted into the mounting portion 37, and then the mounting portion 37 is assembled with the bag regulating portion 51 so that the base 48 and the retaining piece 54, or the airbag 34 and the garnish 19 are connected to form the airbag module A1. Alternatively, it will also be appreciated that the base 48 and the retaining piece 54 are attached to each other firstly, and then the base 48 is engaged with the garnish 19, and then the mounting portion 37 of the airbag 34 is assembled with the clip 47 to form the airbag module A1.

Although the first embodiment shows the garnish side engaging portions 52 of the clip 47 which are hook-shaped to be engaged with the recesses 29a, the clip may be shaped like a bulged retaining leg, as in a garnish side engaging portion 52A of a clip 47A in a second embodiment of the head-protecting airbag device M2 of the present invention shown in FIGS. 17 to 20.

In an airbag module A2 of the second embodiment, a roof rail garnish 19A has a unitary configuration which is not split up. Each of connection portions 29A to be engaged with the clip 47A is provided with a retaining hole 29b for receiving and retaining the engaging portion 52A shaped like a bulged retaining leg.

Each of the clips 47A in the second embodiment includes a base 48A made of synthetic resin and a retaining piece 54 constructed similarly to the first embodiment. The base 48A includes a root portion 49A, a spacer 50A, a bag regulating portion 51A and a garnish side engaging portion 52A. The root portion 49A has a rectangular plate shape elongate in the vertical direction, and is fitted in between a grip portion 59 such that its vertical ends abut against the grip portion 59. The spacer 50A includes two plates projected outward O from an exterior side O of the root portion 49A and confronting each other in the vehicle's front-rear direction, and is so inserted in between side walls 55 of the retaining piece 54 as to prevent the side walls 55 from approaching each other, so that retaining projections 56 and holding projections 57 are prevented from shifting into a mounting hole 2b of the inner panel 2.

The bag regulating portion 51A is formed in hook-shape extending outward from leading ends of two plates 50a of the spacer 50A. As in the first embodiment, the bag regulating portion 51A is adapted to regulate the outward movement of the mounting portion 37 held by a bag holding portion 58, when the spacer 50A is inserted in between the side walls 55. In the illustrated embodiment, the regulating portion 51A is formed to detachably retain exterior periphery of a mounting hole 39c of an outer plate 39a in a mounting bracket 39.

The garnish side engaging portion 52A is projected inward I from a center of the root portion 49A to be engaged with the connecting portion 29A in the roof rail garnish 19A. The engaging portion 52A is a retaining leg that is restorably deformed to reduce its vertical dimension so as to be retained by the interior periphery of the retaining hole 29b.

The garnish side engaging portion 52A of the base 48A constitutes a garnish side joint portion 47a of the clip 47A. A body side joint portion 47b of the clip 47A is constituted by the retaining piece 54, the spacer 50A of the base 48A, and the bag regulating portion 51A of the base 48A.

The bag regulating portion 51A of the base 48A can be detached inward I from the mounting portion 37 at the time the holding portion 58 holds the mounting portion 37 only when a greater force is applied thereto than a force to stop engagement of the base 48A and the connecting portion 29A of the garnish 19A in the garnish side joint portion 47a (or the garnish side engaging portion 52A).

Figure 18:
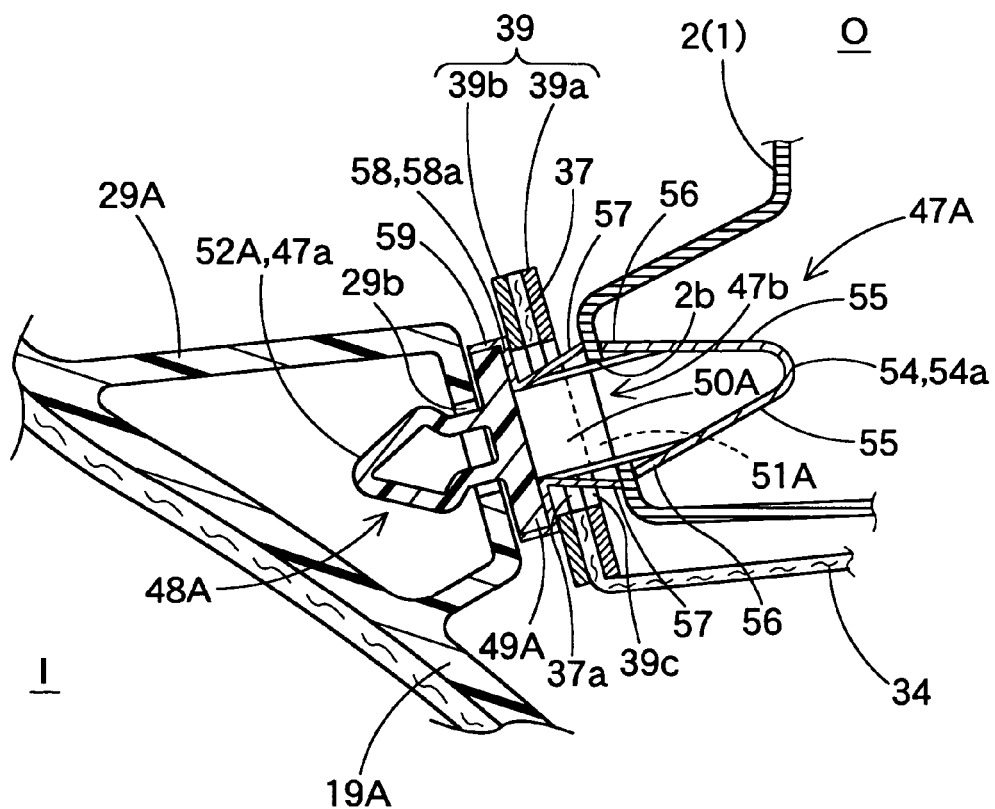
FIG. 18 is a vertical section of a clip of an airbag module in the second embodiment in service.
Figure 19:
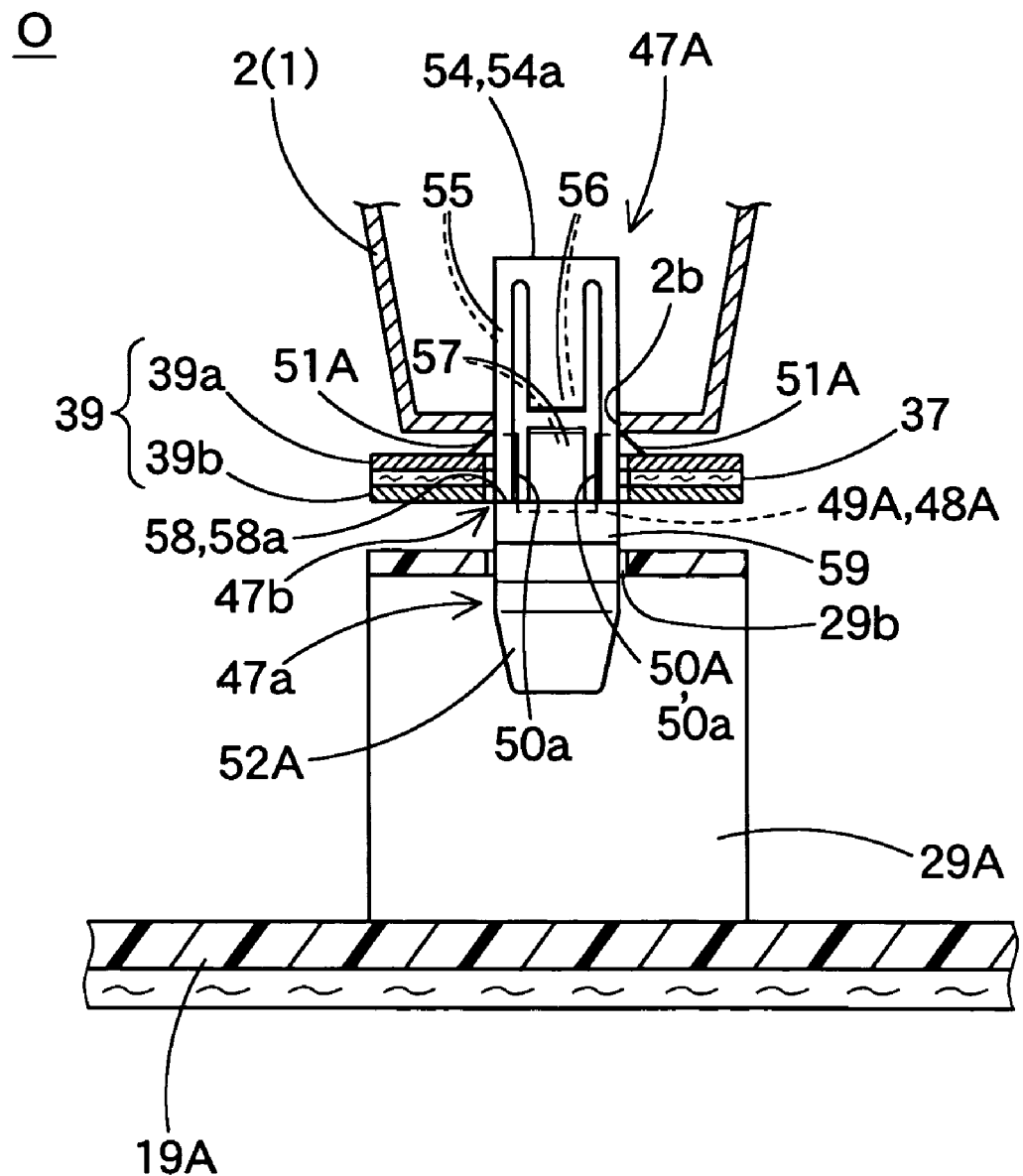
FIG. 19 is a cross section of the same clip in the second embodiment in service.

That is, after the garnish side engaging portion 52A of the clip 47A is engaged with the connecting portion 29A of the garnish 19A, and the retaining piece 54 of the clip 47A is retained by the mounting hole 2b of the inner panel 2 in a condition that the mounting portion 37 of the airbag 34 is held by the bag holding portion 58 while being prevented from moving outward O by the bag regulating portion 51A, as shown in FIGS. 18 and 19, if the garnish 19A is pulled inward I forcefully, the connecting portion 29A is detached from the garnish side engaging portion 52A of the clip 47A firstly, but the retaining piece 54 is not pulled out of the mounting hole 2b, as shown in FIG. 20B. If then the base 48A is pulled inward I even more forcefully, the hook-shaped bag regulating portion 51A is detached from the outer plate 39a of the bracket 39 while leaving the retaining projections 56 of the retaining piece 54 retained by the mounting hole 2b, as shown in FIG. 20B, so that the base 48A is detached from the retaining piece 54 which is still retained by the inner panel 2 while holding the mounting portion 37 by the bag holding portion 58.

Although the airbag module A2 in the second embodiment differs from the airbag module A1 in the first embodiment only in that the garnish 19A does not have a split-up configuration, that each of the connecting portions 29A includes a retaining hole 29b, that each of the clips 47A includes the root portion 49A, in the spacer 50A, and in the bag regulating portion 51A and the garnish side engaging portion 52A, other portions and members are similar to the first embodiment, and therefore, descriptions of those members are omitted by designating them with common reference numerals. Assembling and mounting on the vehicle of the airbag module A2 are similar to the first embodiment, too.

More specifically, in the second embodiment, too, the spacer 50A of the base 48A is located between the side walls 55 of each of the retaining piece 54, and the retaining piece 54 is inserted into each of the holes 37a and 39c of the mounting portions 37 of the folded airbag 34 with the mounting bracket 39 applied thereon. Now each of the mounting portions 37 of the airbag 34 is held from moving toward exterior O by the bag regulating portion 51A of the base 48A, and held from moving toward interior I by the bag holding portion 58 of the retaining piece 54, and thus is retained by the bag holding portion 58 of the retaining piece 54. In this state, the individual clips 47A are joined with the garnish 19A by having each of the garnish side engaging portions 52A (or the garnish side joint portions 47a) engaged with each of the retaining holes 29a of the connecting portions 29A of the garnish 19A. Thus the airbag module A2 is formed. By this time, the inflator 41 to which brackets 42 are attached by cramps 45 is joined with the folded airbag 34, and mounting brackets 39 of the predetermined mounting portions 37 are fitted in retaining legs 32b in mounting seats 32A of the garnish 19A.

The airbag module A2 thus assembled is mounted on a vehicle by firstly bolt 43 fixing the mounting brackets 42 to the inner panel 2, inserting mounting members 27 into mounting holes 2a, and then inserting the retaining pieces 54 of the clips 47A into the mounting holes 2b of the vehicle body 1. Then in each of the clips 47A, retaining projections 56 of the retaining piece 54 are retained in the exterior periphery of the mounting hole 2b and prevented from falling off inward I, so that the roof rail garnish 19A and the mounting portions 37 of the airbag 34 are secured to the vehicle body 1 by the mounting members 27 and the clips 47A.

Thereafter, if the assist grips 11F and 11B are secured to the inner panel 2 utilizing the mounting seats 32A, the airbag module A2, or the head-protecting airbag device M2 is mounted on the vehicle.

Thereafter, in such an occasion as maintenance, the assist grips 11F and 11B are removed, and the mounting members 27 are pushed in toward the exterior O until each of the U-grooves 27g of the cap 27d is positioned in the inner circumference of the mounting hole 2a (refer to FIG. 12C). If then the roof rail garnish 19A is pulled inward I forcefully, each of the axes 27a is pulled out of the inner panel 2, in the mounting members 27, while each of the garnish side engaging portions 52A as the garnish side joint portion 47a is pulled out of the mounting hole 29b and released from the joinder with the connecting portion 29A of the garnish 19A, as shown in FIG. 20A, in the clips 47A. Thus the roof rail garnish 19A is detached from the vehicle body 1.

At this time, in the clips 47A, each of the retaining pieces 54 is not removed from the mounting hole 2b since the spacer 50A remain between the side walls 55 of the retaining piece 54, so that the bag holding portions 58 stably hold the mounting portions 37 of the airbag 34.

The same occurs upon deployment of the airbag 34, i.e., even if positions of the clips 47A in the garnish 19A are detached from the vehicle body 1 upon deployment of the airbag 34, the airbag 34 remains attached to the vehicle body 1 by the clips 47A, and thus is able to deploy stably.

In occasions of maintenances and so on, the garnish 19A is detached from the vehicle body 1, and each of the bag regulating portions 51A of the base 48A is pulled inward I and taken off from the outer plate 37a of the bracket 39 attached to the mounting portion 37 of the airbag 34. Then as shown in FIGS. 20B and 20C, the spacer 50A of the base 48A is pulled out from a space between the side walls 55 of the retaining piece 54, and the grip portion 59 is gripped to bring the side walls 55 closer to each other such that the retaining projections 56 are shifted into the mounting holes 2b of the vehicle body 1. If then the retaining pieces 54 are pulled inward I out of the mounting holes 2b, the mounting portions 37 of the airbag 34 are detached from the vehicle body 1, and the airbag 34 can be taken care of.

Therefore, the airbag module A2 in the second embodiment is also able to assure stable holding of the airbag 34 while keeping easy maintenances of the roof rail garnish 19A and the airbag 34.

What is claimed is:

1. A head-protecting airbag device comprising:
an airbag folded and housed in the upper periphery of side windows inside a vehicle, the airbag being deployable to cover the side windows when fed with inflation gas; and
a roof rail garnish for covering a vehicle's interior side of the folded airbag, the garnish including a door portion openable upon airbag deployment; wherein:
at least the airbag and the roof rail garnish constitute an airbag module, at least the airbag and the roof rail garnish are mounted on the vehicle at one time by attaching the airbag module to a vehicle;
the airbag module includes a clip, the clip including a garnish side joint portion to be detachably engaged with the roof rail garnish, and a vehicle body side joint portion to be engaged with vehicle body in a state of holding a mounting portion of the airbag;
in the clip, an engaging force of the garnish side joint portion with the roof rail garnish is predetermined weaker than an engaging force of the body side joint portion with the vehicle body, whereby the roof rail garnish is detachable from the vehicle body while leaving the mounting portion of the airbag attached to the vehicle body,
the roof rail garnish includes a mounting member to be detachably attached to the vehicle body having mounting holes;
the mounting member includes a metal axis ranged in exterior side of the roof rail garnish, and a cap made from rubber or soft synthetic resin to be covered over the axis;
the axis includes a neck portion and a head bulged in radius direction at the leading end of the neck portion;
the cap has a substantially cylindrical shape capable of covering over the axis and being retained by the head of the axis, the cap being provided with: a thick retaining portion located at the leading end; a retaining recess located in the outer circumference near a root part of the retaining portion; and a U-groove located in the outer circumference near a root part of the cap; and an inner diameter of the cap is predetermined such that the head of the axis may be pulled out of the cap when the U-groove is located in an inner circumference of the mounting hole in the vehicle body as the cap is retained by the head of the axis;
when the mounting member of the garnish is attached to the vehicle body, the mounting member is inserted into a mounting hole of the vehicle body from vehicle's interior as the cap is retained by the head of the axis, and has the retaining portion of the cap retained in exterior periphery of the mounting hole, such that the roof rail garnish is attached to the vehicle body in a condition that the garnish is capable of shifting vehicle's inward according to plastic deformation of the cap retaining portion when the garnish is pulled vehicle's inward; and
when the garnish is detached from the vehicle body, the mounting member is pushed in vehicle's outward together with the roof rail garnish until the U-groove of the cap is positioned in the inner circumference of the mounting hole, and then the axis is pulled out of the cap and the mounting hole toward vehicle's interior while leaving the cap retained in the periphery of the mounting hole, such that the garnish is detached from the vehicle body.

2. A head-protecting airbag device comprising:

an airbag folded and housed in the upper periphery of side windows inside a vehicle, the airbag being deployable to cover the side windows when fed with inflation gas; and a roof rail garnish for covering a vehicle's interior side of the folded airbag, the garnish including a door portion openable upon airbag deployment; wherein:

at least the airbag and the roof rail garnish constitute an airbag module, at least the airbag and the roof rail garnish are mounted on the vehicle at one time by attaching the airbag module to a vehicle;

the airbag module includes a clip the clip including a garnish side joint portion to be detachably engaged with the roof rail garnish, and a vehicle body side joint portion to be engaged with vehicle body in a state of holding a mounting portion of the airbag; and in the clip, an engaging force of the garnish side joint portion with the roof rail garnish is predetermined weaker than an engaging force of the body side joint portion with the vehicle body, whereby the roof rail garnish is detachable from the vehicle body while leaving the mounting portion of the airbag attached to the vehicle body, wherein the body side joint portion of the clip allows the mounting portion of the airbag to be detachable from the vehicle body after the roof rail garnish is removed, wherein the clip comprises:

a retaining piece including: two side walls confronting each other formed by bending a band-shaped spring sheetmetal to have a substantially U-shaped section; retaining projections projecting outwardly from each of the side walls for preventing the clip from falling off vehicle's inward when inserted into a mounting hole of the vehicle body and retained in exterior periphery of the mounting hole; and a bag holding portion located further toward the vehicle's inward than the retaining projections, the bag holding portion being inserted into the mounting portion of the airbag for holding the mounting portion and keeping the mounting portion from shifting vehicle's inward; and a base including: a spacer to be inserted in between the side walls of the retaining piece for preventing the side walls from approaching each other, such that the retaining projections are prevented from shifting into the mounting hole in the vehicle body; a bag regulating portion for keeping the mounting portion of the airbag held by the bag holding portion from shifting vehicle's outward when the spacer is inserted in between the side walls; and a garnish side engaging portion to be detachably engaged with the roof rail garnish;

the garnish side engaging portion of the base constitutes the garnish side joint portion;

the retaining piece, the spacer of the base, and the bag regulating portion of the base cooperatively constitute the body side joint portion;

the base and the retaining piece are separate pieces; and an engaging force of the bag regulating portion with the mounting portion of the airbag as the bag holding portion holds the mounting portion is predetermined greater than an engaging force of the garnish side joint portion with the roof rail garnish, whereby the roof rail garnish is detachable from the vehicle body while leaving the mounting portion of the airbag attached to the vehicle body;

the garnish side engaging portion of the base is detachable and removable from the roof rail garnish without breaking, wherein each of the mounting portions of the airbag includes a mounting hole for receiving the retaining piece of the clip;

a mounting bracket is attached to the mounting portion, the mounting bracket including an outer plate and an inner plate each of which has a through hole corresponding to the mounting hold of the mounting portion;

the bag holding portion of the retaining piece is located at an inner end side of the retaining piece and has an L-shaped section extending outwardly;

the bag holding portion holds the mounting portion of the airbag from moving to the vehicle's inward, and makes the outer plate of the mounting bracket abutted against the vehicle body when the retaining piece is retained by the mounting hole of the vehicle body; and the bag regulating portion of the base includes hooks detachably retaining outer edges of the outer plate attached to the mounting portion of the airbag when the spacer is inserted in between the side walls.

3. The head-protecting airbag device according to claim 2, wherein:

the bag holding portion of the retaining piece is located at an inner end side of the retaining piece and has an L-shaped section extending outwardly, the bag holding portion further includes a grip portion at an outer edge of the bag holding portion, and the grip portion is configured to be gripped to bring the side walls of the retaining piece close to each other after the spacer of the base is removed from a space between the side walls such that the retaining piece is removable from the mounting hole of the vehicle body.

4. The head-protecting airbag device according to claim 2, wherein:

each of the side walls of the retaining piece is provided, in the bag holding portion, with a holding projection, the holding projection being raised outwardly by cutwork to confront an interior end of the retaining projection, and the retaining piece is configured so that, when the retaining piece is inserted into the mounting hole of the vehicle body, a periphery of the mounting hole is positioned between the retaining projections and the holding projections such that the retaining piece is hold from moving inward or outward.

5. The head-protecting airbag device according to claim 2, wherein:

the garnish side engaging portion is configured into a hook-like shape or retaining leg wherein the garnish side engaging portion retains a retained portion on the roof rail garnish, the retained portion being formed by a recess or a retaining hole.

* * * * *